(12) United States Patent
Casagrande et al.

(10) Patent No.: US 11,036,066 B2
(45) Date of Patent: *Jun. 15, 2021

(54) METHODS AND APPARATUS FOR VERIFYING OPTICAL MEASUREMENTS

(71) Applicants: Thomas R. Casagrande, Fresno, CA (US); Matthew Barnes, Fresno, CA (US)

(72) Inventors: Thomas R. Casagrande, Fresno, CA (US); Matthew Barnes, Fresno, CA (US); Steve Moon, Valencia, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/411,003

(22) Filed: May 13, 2019

(65) Prior Publication Data

US 2019/0271862 A1    Sep. 5, 2019

Related U.S. Application Data

(63) Continuation-in-part of application No. 15/879,188, filed on Jan. 24, 2018, now Pat. No. 10,747,027.

(Continued)

(51) Int. Cl.
| | | |
|---|---|---|
| *G02C 13/00* | (2006.01) | |
| *B24B 13/005* | (2006.01) | |
| *G02C 7/02* | (2006.01) | |

(52) U.S. Cl.
CPC ........ *G02C 13/005* (2013.01); *B24B 13/0055* (2013.01); *G02C 7/021* (2013.01)

(58) Field of Classification Search
CPC .... A61B 3/00; A61B 3/10; A61B 3/14; G02C 13/00; G02C 13/005; G02C 7/06;

(Continued)

(56) References Cited

U.S. PATENT DOCUMENTS

| | | |
|---|---|---|
| 2,491,312 A | 12/1949 | Henry et al. |
| 2,884,702 A | 5/1959 | Engelmann |

(Continued)

FOREIGN PATENT DOCUMENTS

EP    1157656 A1    11/2001

OTHER PUBLICATIONS

Intercom Optic, CT 4116 Pupil Height Meter, www.intercomoptic.com/Product/view/id/366.

(Continued)

*Primary Examiner* — Jie Lei
(74) *Attorney, Agent, or Firm* — Sierra IP Law, P.C.; Mark D. Miller

(57) ABSTRACT

Improved optical measuring devices and methods are disclosed for checking certain measurements taken of a patient's face before these measurements are used to create eyeglass lenses for the patient. Embodiments of the invention include a support frame receiving an eyeglass frame having demonstration lenses mounted therein. The eyeglass frame is held in place, and one or more mechanical structures are provided below the support frame which support one or more movable markers, typically one for each lens. The structures are moved according to the measurements taken of the patient's face. A stamping or marking mechanism is provided on each structure which is used to mark the pupil location on each respective lens after the structures are moved according to the patient measurements. The marked lenses are then taken to the patient for verification and modification of measurements, if necessary. Once the measurements have been verified, final lenses may be created.

22 Claims, 30 Drawing Sheets

Related U.S. Application Data

(60) Provisional application No. 62/450,046, filed on Jan. 24, 2017.

(58) Field of Classification Search
CPC ..... G02C 7/021; B24B 13/00; B24B 13/0055; G01B 1/00; B41M 3/00; B41M 3/003; B43L 13/00
USPC ............. 351/159.8, 169, 178, 204, 245, 246
See application file for complete search history.

(56) References Cited

U.S. PATENT DOCUMENTS

| | | |
|---|---|---|
| 3,763,747 A | 10/1973 | Biechel et al. |
| 3,938,655 A | 2/1976 | Romolt |
| 4,055,900 A | 11/1977 | Grolman et al. |
| 4,206,549 A | 6/1980 | Gould |
| 4,208,800 A | 6/1980 | Grolman et al. |
| 4,368,958 A | 1/1983 | Buget |
| 4,575,946 A | 3/1986 | Bommarito |
| 4,653,192 A | 3/1987 | Conrad et al. |
| 5,037,193 A | 8/1991 | Funk |
| 5,640,775 A | 6/1997 | Marshall |
| 5,691,799 A | 11/1997 | Ramachandran |
| 5,754,272 A | 5/1998 | Dimalanta |
| 6,286,957 B1 | 9/2001 | Livnat |
| 6,564,432 B1 | 5/2003 | Kushner |
| 7,325,922 B2 | 2/2008 | Spivey |
| 7,950,800 B2 | 5/2011 | Nauche et al. |
| 7,996,997 B2 | 8/2011 | Warntjes et al. |
| 10,747,027 B2 * | 8/2020 | Casagrande ........... B41M 3/003 |
| 2007/0115429 A1 | 5/2007 | Divo |
| 2014/0009740 A1 | 1/2014 | Makino et al. |
| 2015/0002807 A1 | 1/2015 | Haddadi |

OTHER PUBLICATIONS

Pureness, Digital Lenses are the Wave of the Future, www.kenteyeclinic.com/2013/05/15/digital-lenses-are-the-wave-of-the-future/.
Unity Progressive Lenses Centration Chart (2014).
International Search Report (ISR) and Written Opinion from co-pending PCT application PCT/US2018/015094 dated Apr. 6, 2018 (PCT/ISA/220 and PCT/ISA237).

* cited by examiner

METHODS AND APPARATUS FOR VERIFYING OPTICAL MEASUREMENTS

This application is a continuation-in-part of and claims the benefit of U.S. Utility application Ser. No. 15/879,188 filed on Jan. 24, 2018, which is a non-provisional of and claims the benefit of U.S. Provisional Application No. 62/450,046 filed on Jan. 24, 2017, both of which applications are incorporated herein by this reference in their entirety.

BACKGROUND OF THE INVENTION

The present invention relates to eyeglasses, and more particularly to optical measuring devices and methods for checking certain measurements taken of a patient's face before these measurements are used to create eyeglass lenses for the patient.

Progressive addition lenses (sometimes called no-line bifocals) are used for patients who need to see clearly both near and far. Such lenses include a clear channel through which the patient looks. It is important that such lenses, or any prescription lenses, be correctly mounted and properly positioned in the frames to fit the patient correctly for clear comfortable vision. In particular, prescription lenses need to be mounted in their frames so that they are properly positioned relative to the pupils of the patient when the patient wears them.

In order for a patient to be satisfied with their prescription lenses, it is important that accurate measurements of the patient's face be taken and verified before the lenses are created and mounted in the frames. The critical measurements include (a) the monocular pupillary distance for each eye (right/left), which is the distance from the center of the nose to the center of the pupil; and (b) the segment (seg) height for each eye (right/left), which is the distance from the bottom of the frame where the lens sits to the center of the pupil. In most cases, it is also important to know the thickness of the frame itself. Although devices exist for taking these measurements, the measurements taken may be imperfect or imprecise, or errors may occur, which may result in the creation of lenses that are unsuitable for the patient. When this occurs, the lenses must be remade, resulting in additional cost to the eye doctor, lab and/or patient.

Before new lenses are ordered, the monocular pupillary distance and the segment height for each eye of the patient are measured. The thickness of the particular frame in which the lenses are to be mounted is also determined. This information is then used to create a set of lenses for the patient to be mounted in the particular frame. Unfortunately, the measurements taken may or may not be accurate, depending on the method used. In some cases, no double checking is done, resulting in unverified measurements being sent to the lab with instructions to create lenses. This could result in the creation of unsuitable lenses, in which case the lenses would have to be discarded and redone, resulting in losses and delays.

One current method for checking the monocular pupillary distance and the segment height measurements of the patient involves the use of a centration chart. This is a flat sheet having measurement lines thereon. A set of demo lenses are inserted into the eyeglass frame selected by the patient, and placed on this chart for visual inspection. The chart provides a very rough and imprecise check of the measurements taken, and may not detect positioning errors of up to 2 mm, which is more than enough for a patient to be dissatisfied with the result.

It is therefore desirable to be able to precisely check the measurements of a patient's right and left monocular pupillary distance and segment height before they are sent to a lab for creation of lenses, particularly progressive addition lenses, so that suitable lenses are created for the patient.

The present invention provides methods and apparatus for quickly and precisely performing such checking.

SUMMARY OF THE INVENTION

The present invention provides methods and apparatus for checking the right and left monocular pupillary distance and segment height measurements from a patient's face before those measurements are used to create eyeglass lenses, including without limitation progressive addition lenses, for the patient.

In some embodiments of an apparatus of the invention, a removable support frame is provided for holding an eyeglass frame (sometimes referred to herein as a set of eyeglass frames) that have been selected by the patient, and which have been fitted with demonstration (demo) lenses. One or more clamps, clips, springs, movable walls or other frictional holders are provided on the removable support frame for holding the eyeglass frame. In these embodiments, the eyeglass frame with the demo lenses are mounted in the support frame, and the support frame is placed into a receptacle. The receptacle is provided with movable markers for placing temporary marks on the demo lenses. Ordinarily a pair of markers is provided, one for marking each of the two lenses; however, in some embodiments a single marker may be provided which is used to mark each of the lenses.

In these embodiments, the one or more markers are provided on movable mounts that may be moved from left to right in the receptacle (i.e., along the X axis) for the left and right monocular pupillary distances; and from bottom to top in the receptacle (i.e., along the Y axis) for the left and right segment heights. The positions of the movable mounts may be changed manually, or with electronically controlled motors, or using a combination of both manual and electronic adjusting devices. The measurements of the patient's left and right monocular pupillary distance and the patient's left and right segment heights are used to position the movable mounts holding the markers, respectively, along the X and Y axes. In manual systems, this is preferably accomplished using a micrometer to move the mounts according to each X and Y measurement. In motorized systems, this is preferably accomplished using step motors which are operated by an electronic control system which is provided with the measurements. The thickness of the eyeglass frame (the frame height) may also need to be accounted for. In some embodiments, each of the markers may be adjusted along the Y axis according to the frame height. In other embodiments, the entire support frame holding the eyeglass frame may be adjusted along the Y axis according to the frame height. This may be accomplished using a manual or motorized adjustment.

In these embodiments, once the markers have been positioned according to (a) the patient's left and right monocular pupillary distances, (b) the patient's left and right segment heights, and (c) the eyeglass frame height (if applicable), the lenses may be marked. It is to be appreciated that in some cases the frame height is inapplicable, such as, without limitation, if the particular eyeglass frame design has no support structure underneath the lenses. In some embodiments, the marking may be accomplished by upward movement of the markers which come into contact with the lenses, leaving temporary marks thereon. In other embodiments, the support frame may be suspended on movable springs, cushions or other flexible or deformable members that allow the entire support frame to be pushed into the receptacle, which causes the lenses to come into contact with the markers, leaving temporary marks on the lenses. The marked eyeglasses (i.e., the frame with lenses) may then be removed from the support frame and taken to the patient where the accuracy of the measurements may be verified using the marked lenses.

It is to be appreciated that in electronically controlled or computerized embodiments of the apparatus of the invention, the measured left and right monocular pupillary distances and the measured left and right segment heights may be input into a computer system through a user interface. The frame height, if applicable, may also be input. The electronic control or computer system may then use these measurements to operate motors which move the markers used to mark the lenses. The measurements may also be displayed on the user interface and/or the receptacle. If the verification process results in changes to the measurements, updated measurements may be input into the electronic control or computer system and used to move the markers to different positions to again temporarily mark the lenses.

In other embodiments of the apparatus of the invention, an open compartment is provided for receiving and holding a set of eyeglass frames that have been selected by the patient, and which have been fitted with demo lenses. In these embodiments, the selected set of eyeglass frames with demo lenses is placed into the compartment, after which one or more clamps, other movable members and/or walls are used to engage and secure the eyeglasses in a fixed position in the compartment. The clamps, movable members and/or movable walls may be operated manually or via electronic controls.

In these embodiments, the compartment is provided with one or more movable markers located below the engaged eyeglasses. As with other embodiments, the positions of the markers in these embodiments are moved according to (a) the patient's left and right monocular pupillary distances, (b) the patient's left and right segment heights, and (c) the eyeglass frame height, if applicable. The positioning may be accomplished manually using micrometers, gauges or the like, or using electronically controlled motors, or both. Once the markers are positioned, in some embodiments they may be moved upward against the lenses in the fixed-positioned eyeglasses, leaving temporary marks thereon. In other embodiments, the clamps holding the eyeglasses may be moved downward bringing the lenses into contact with the markers, leaving temporary marks on the lenses. The marked lenses may then be taken to the patient to verify accuracy.

Some embodiments of an apparatus of the invention include a receptacle or compartment which may have a recess therein for receiving and holding a set of eyeglass frames that have been selected by the patient, and which have been fitted with demo lenses. In such embodiments, adjustable members are provided which are used to move two central structures to the pupil positions of each lens using the right and left monocular pupillary distance and segment height measurements that have been taken from the patient. If applicable, adjustable member are also moved according to the frame height. The device then marks the pupil positions on both lenses. The marked eyeglasses are then placed on the patient to check to see if the measured pupil positions are correct. If so, then the measurements are used to create the lenses. If not, then new measurement(s) are taken and the marking process is repeated until the correct pupil position(s) are obtained. Once accurate measurements have been verified, they are then used to create the lenses.

In embodiments of methods of the present invention, preliminary left and right monocular pupillary distances and preliminary left and right segment heights are measured for a patient. A set of frames with demo lenses thereon are placed into a receptacle above one or more movable marking devices. The preliminary measurements, along with the height of the frame selected by the patient, if applicable, are used to adjust the positions of markers in the apparatus. Temporary marks are then placed on the demo lenses using the markers. The eyeglasses with the marked lenses are then taken to the patient where they are placed on the patient's face and checked by a practitioner for verification. If the practitioner determines that the marks are in the correct places for the patient, the preliminary measurements are used to create final lenses. However, if the practitioner determines that the either of the marks is not in the correct place, one or more new measurements are taken. The temporary marks are then removed from the lenses, new temporary marks representing the new measurements are placed on the lenses, and the lenses are again taken to the patient for verification. These steps are repeated until the practitioner is satisfied that the marks are in the correct places for the patient, whereupon the measurements for those marks are used to create final lenses.

It is to be appreciated that embodiments of the present invention may be used to verify measurements for any kind of eyeglass lenses, including without limitation progressive addition lenses (no-line bifocals).

It is therefore an object of the present invention to provide methods and apparatus for double checking the measurements of a patient's right and left monocular pupillary distance, and right and left segment height, before these measurements are used to create eyeglass lenses for the patient.

It is a further object of the present invention to provide methods and apparatus to avoid costly re-grinding of eyeglass lenses and patient disappointment.

It is a further object of the present invention to provide methods and apparatus for manually setting the positions of lens markers according to measured left and right monocular pupillary distances, measured left and right segment heights, and measured eyeglass frame height (if applicable), so that the markers may be used to place temporarily marks on lenses to verify the accuracy of the measurements.

It is a further object of the present invention to provide methods and apparatus for electronically setting the positions of lens markers according to measured left and right monocular pupillary distances, measured left and right segment heights, and measured eyeglass frame height (if applicable), so that the markers may be used to place temporarily marks on lenses to verify the accuracy of the measurements.

It is a further object of the present invention to provide a user interface for receiving measurements of left and right monocular pupillary distances, measurements of left and right segment heights, and measurements of eyeglass frame height (if applicable) for use in electronically positioning markers used to place temporarily marks on lenses to verify the accuracy of the measurements.

Additional objects of the invention will be apparent from the detailed descriptions and the claims herein.

DETAILED DESCRIPTIONS

Figure 1:
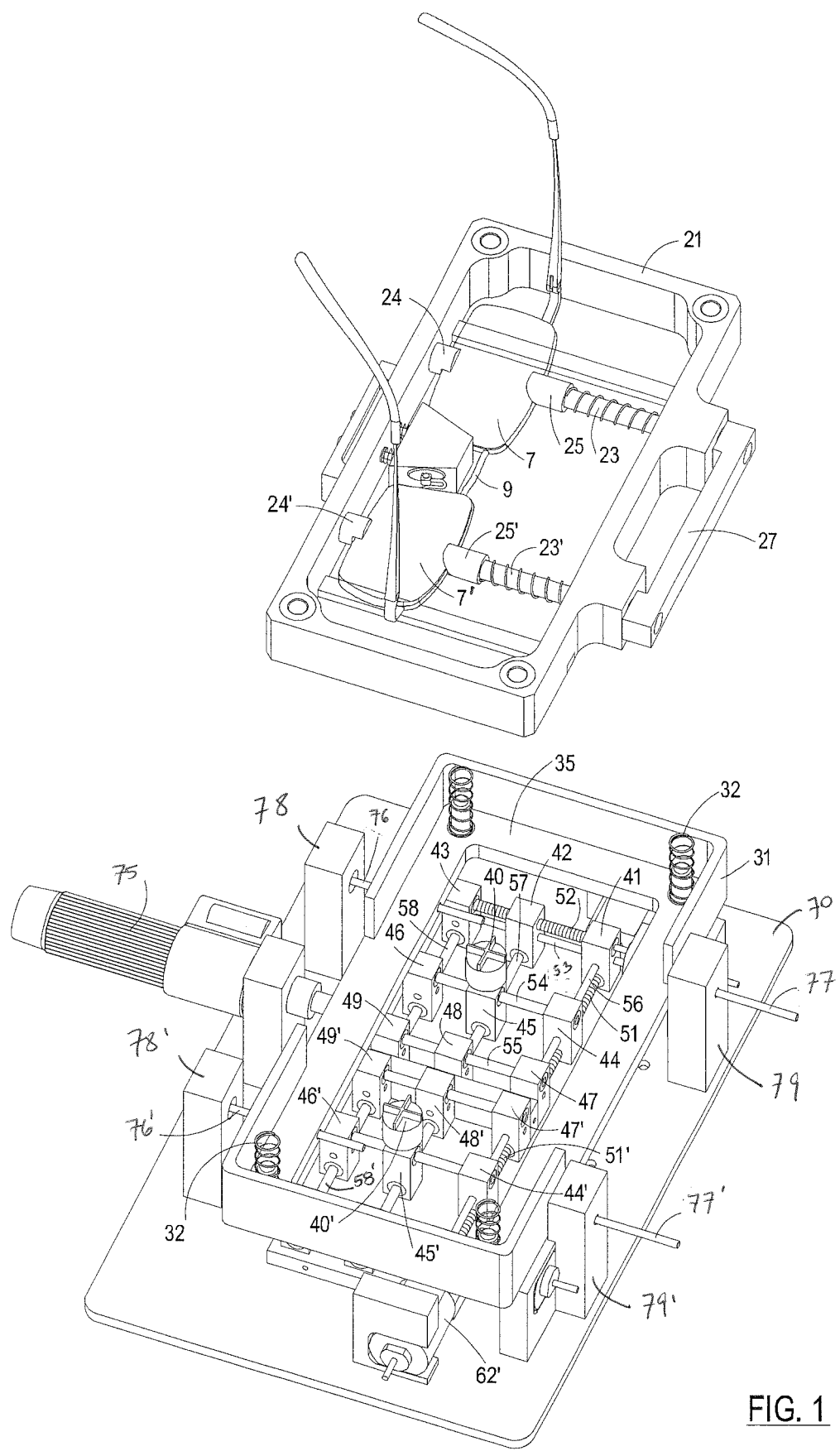
FIG. 1 is a perspective view of an embodiment of the invention showing a set of eyeglasses mounted in a support frame above a receptacle for receiving said support frame.
Figure 2:
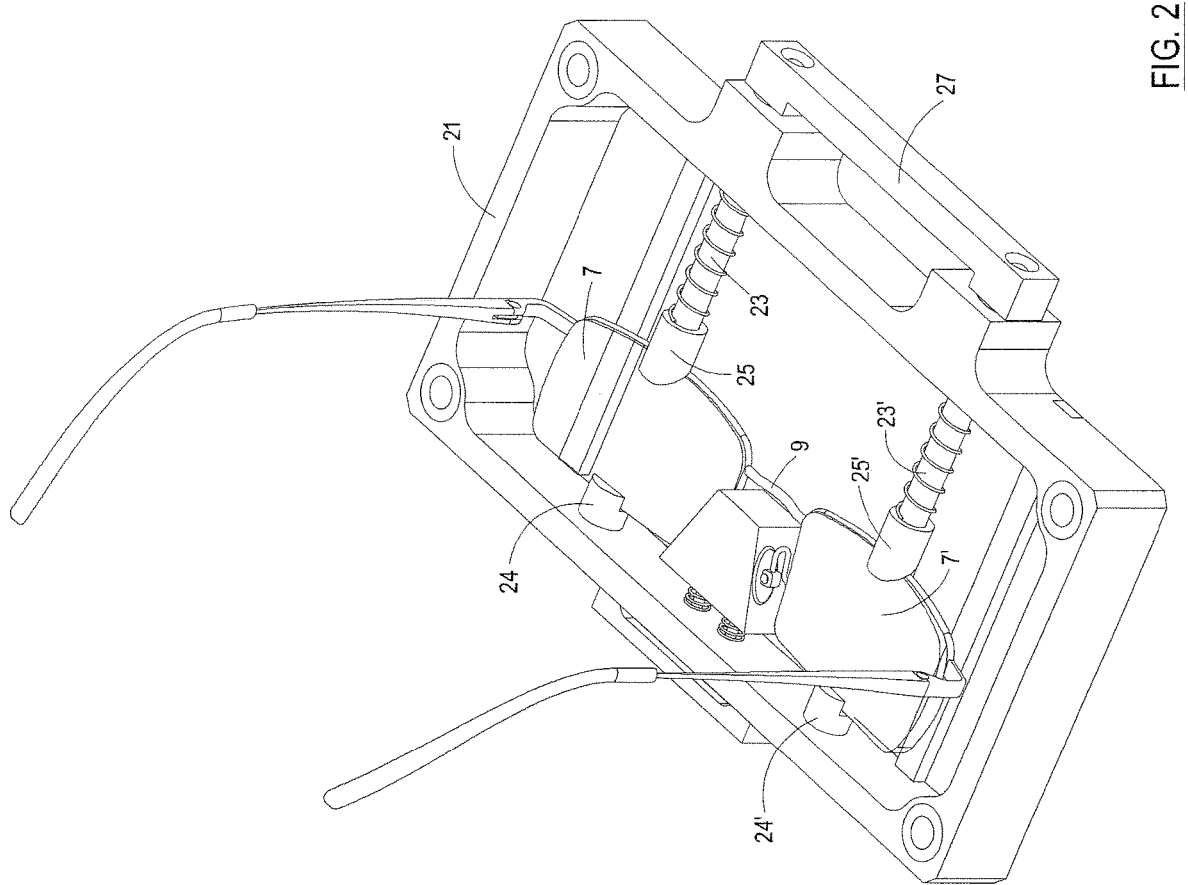
FIG. 2 is an enlarged perspective view of the support frame of FIG. 1 in which a set of eyeglasses has been mounted.

Referring to the drawings wherein like reference characters designate like or corresponding parts throughout the several views, and referring particularly to the exemplary embodiment of FIGS. 1-8, it is seen that in this illustrated embodiment, a support frame 21 is provided for holding an eyeglass frame 9 (sometimes referred to as a set of eyeglass frames) having demonstration (demo) lenses 7 (left) and 7' (right) therein. Support frame 21 may be provided with one or more movable clamps 23 (left) and 23' (right) for holding the eyeglass frame 9. In the exemplary embodiment illustrated in FIGS. 1-8, clamps 23, 23' are shown as spring loaded, and include upper 25 (left) and upper 25' (right) brackets, and lower 24 (left) and lower 24' (right) brackets for engaging the upper and lower edges of the eyeglass frame 9 to hold the frame in a fixed position.

It is to be appreciated that any suitable mechanism(s) may be used to hold the eyeglass frame 9 in place including without limitation, one or more clips, clasps, suction cups, screws, movable walls, movable fingers, or other similar engaging structures. For example, and without limitation, movable upper and/or lower walls may be provided as part of support frame 21 to engage the eyeglass frame 9. In another example, movable left and/or right walls may be provided as part of support frame 21 to engage eyeglass frame 9. In yet another example, movable upper and/or lower walls as well as movable left and/or right walls may be provided to engage frame 9. It is to be appreciated that in some embodiments one such wall (e.g. bottom and/or left) may be stationary while the opposite wall (e.g. top and/or right) may be movable. One or more optional handles or tabs 27 may be provided on support frame 21 to aid in manipulation thereof.

Figure 3:
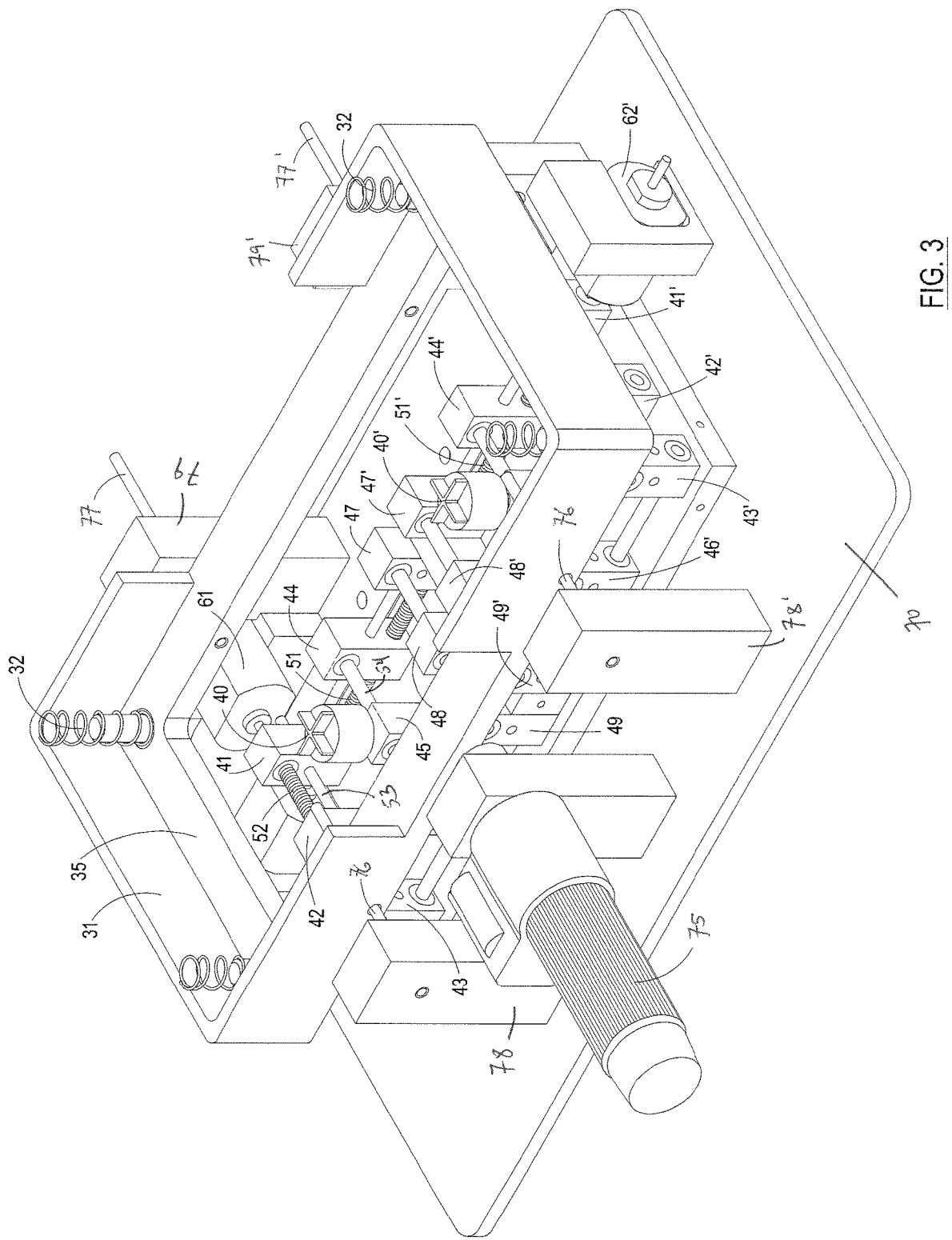
FIG. 3 is an enlarged perspective view of the receptacle of FIG. 1

Although the support frame 21 illustrated in FIGS. 1 and 3 is shown having a generally rectangular shape, it is to be appreciated that in other embodiments, support frame 21 may be provided in any suitable shape such as, without limitation, square, hexagonal, round, oval, or the like—so long as the complementary receptacle 31 has a similarly shaped recess 35.

In alternative embodiments (such as the exemplary embodiment shown in FIGS. 11-12, the exemplary embodiment shown in FIGS. 13-17, the exemplary embodiment shown in FIGS. 18-23, and/or other embodiments), it is to be appreciated that no removable unit 21 may be provided, and that in such embodiments, the receptacle 31 may itself be provided with clamps 23 or other suitable structures to grasp the eyeglass frame 9.

Figure 11:
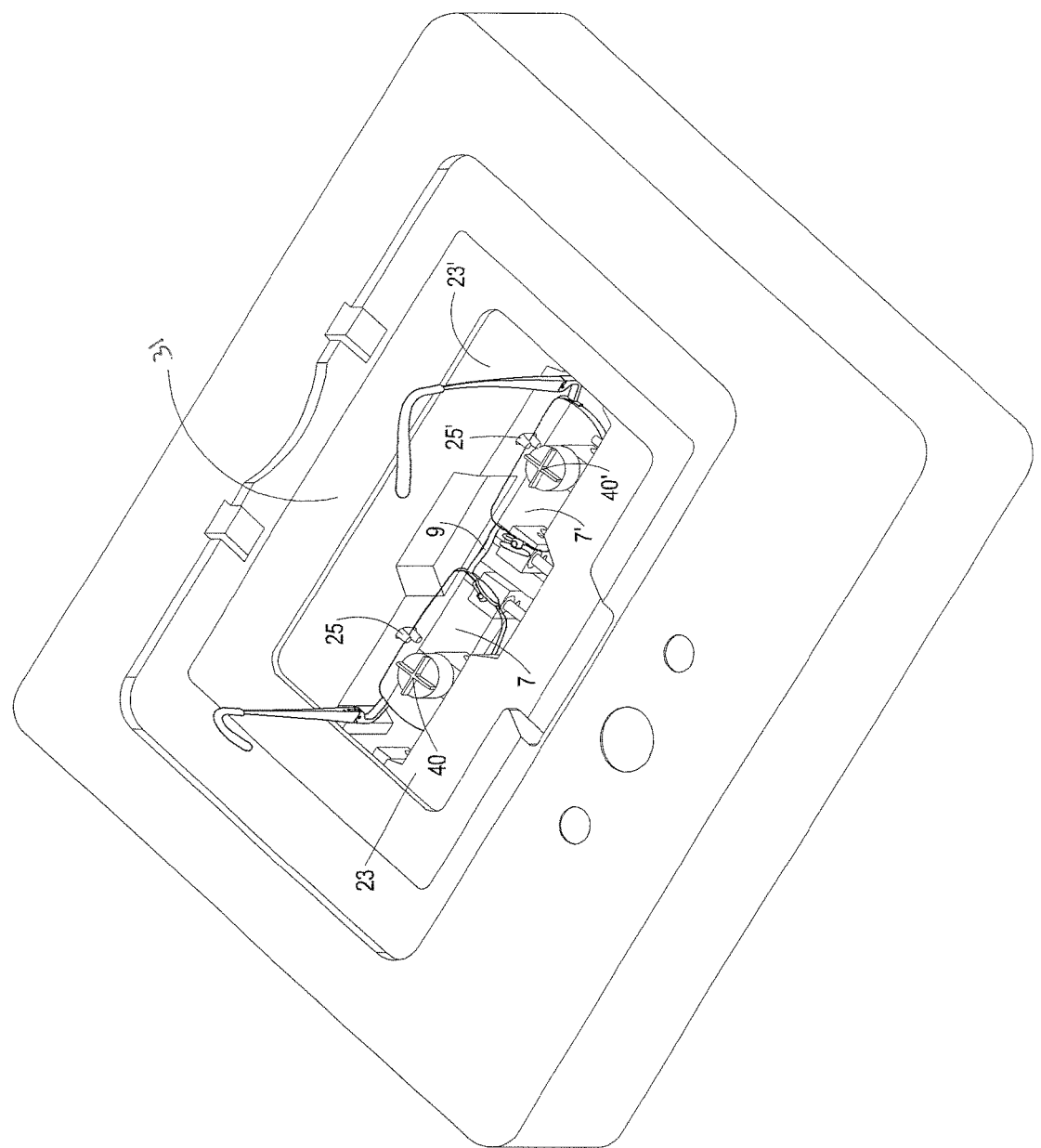
FIG. 11 is a perspective view of the embodiment of FIG. 10 showing a set of eyeglasses that have been mounted therein.
Figure 12:
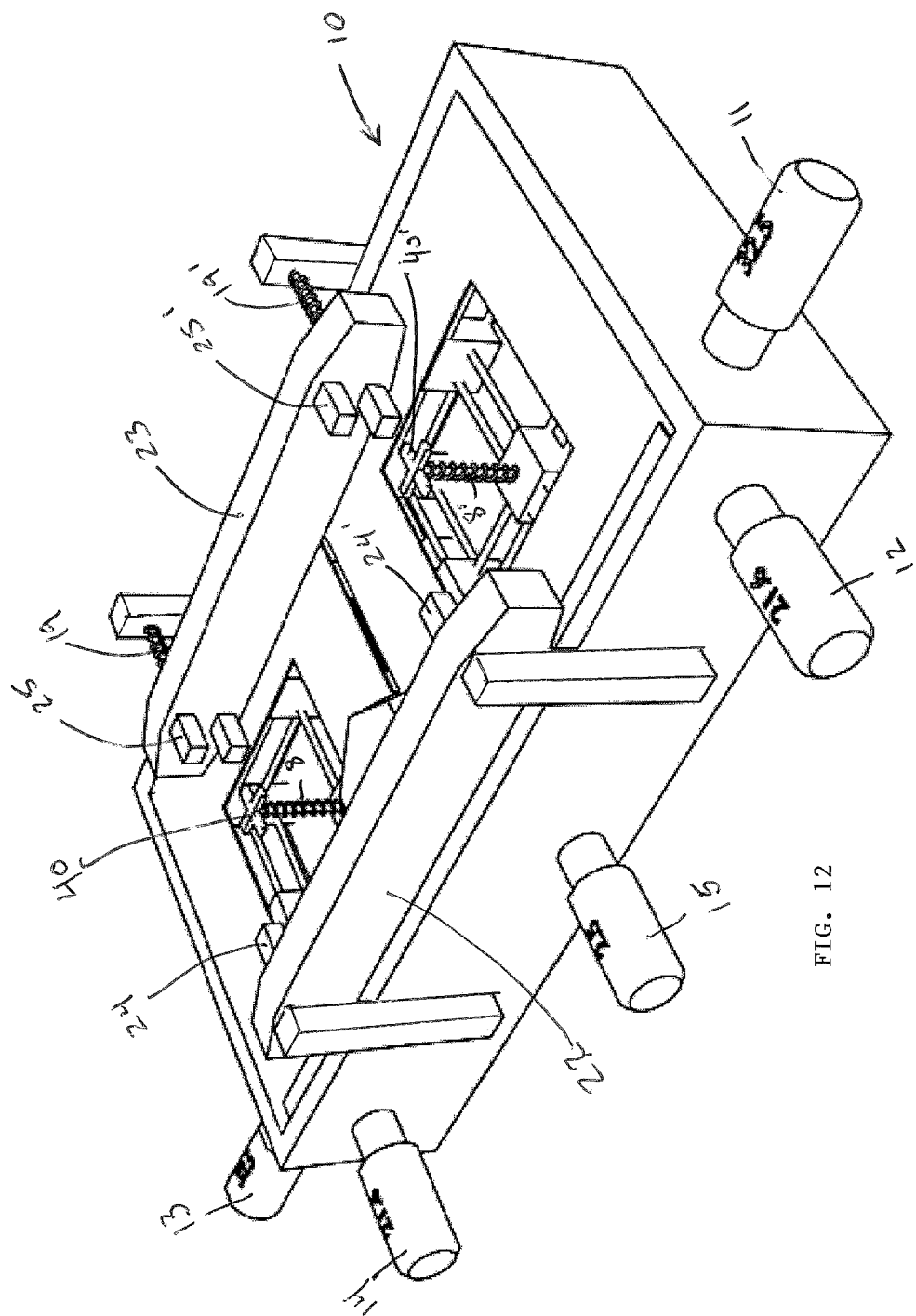
FIG. 12 is a perspective view of an alternative embodiment of the invention in an empty condition.

In the exemplary illustrated embodiment of FIGS. 11-12, the securing structure is in the form of movable walls 23 which close around the eyeglass frame 9 to hold it in place. In the illustrated embodiment of FIGS. 11-12, a lower wall 23 moves up, and an upper wall 23' moves down to engage the frame 9, as shown in FIG. 11. The position of the frame 9 is fixed using upper guides 25, 25' and lower guides 24, 24' (not shown). It is to be appreciated that in different embodiments, one of upper wall 23' or lower wall 23 may be stationary, and the other of wall upper wall 23' or lower wall 23 may be movable such that one wall moves toward the other to engage the frame 9 between them. (See, e.g., the embodiment of FIGS. 12-17). It also is to be appreciated that in different embodiments, movable walls 23 may be provided on either the left side and/or the right side of the frames 9, or both, instead of above and below them, in order to engage frame 9 between them. In some embodiments, including others described herein, it is to be appreciated that guides 24, 25 may be provided on the sides instead of above and below frame 9.

In some embodiments, such as, without limitation, the embodiment shown in FIGS. 11-12, the clamps or guides holding eyeglass frame 9 may be flexible such that the frame 9 may be pushed downward in order to cause lenses 7, 7' to come into temporary contact with the markers 40, 40'; or, in other embodiments, the markers themselves 40, 40' may be mounted on structures (such as, without limitation, springs or solenoids) that are capable of moving upward to cause the markers 40, 40' to come into temporary contact with the lenses 7, 7'. In these embodiments, and others described herein, the positioning mechanisms for the markers 40, 40' may be according to any of the embodiments disclosed herein.

Figure 4:
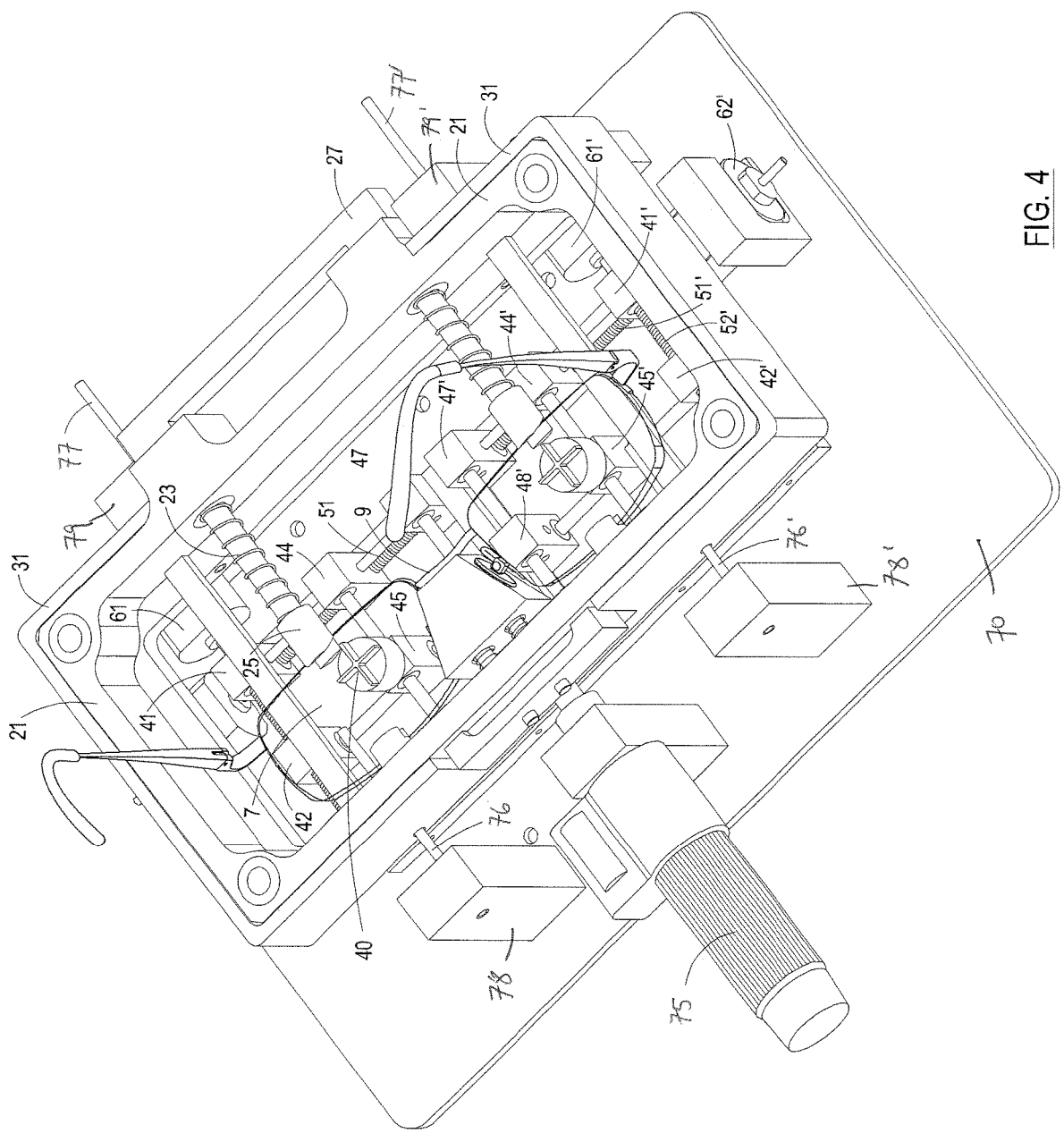
FIG. 4 is a perspective view of the embodiment of FIG. 1 showing a set of eyeglasses mounted in a support frame that has been engaged with a receptacle for receiving said support frame.
Figure 5:
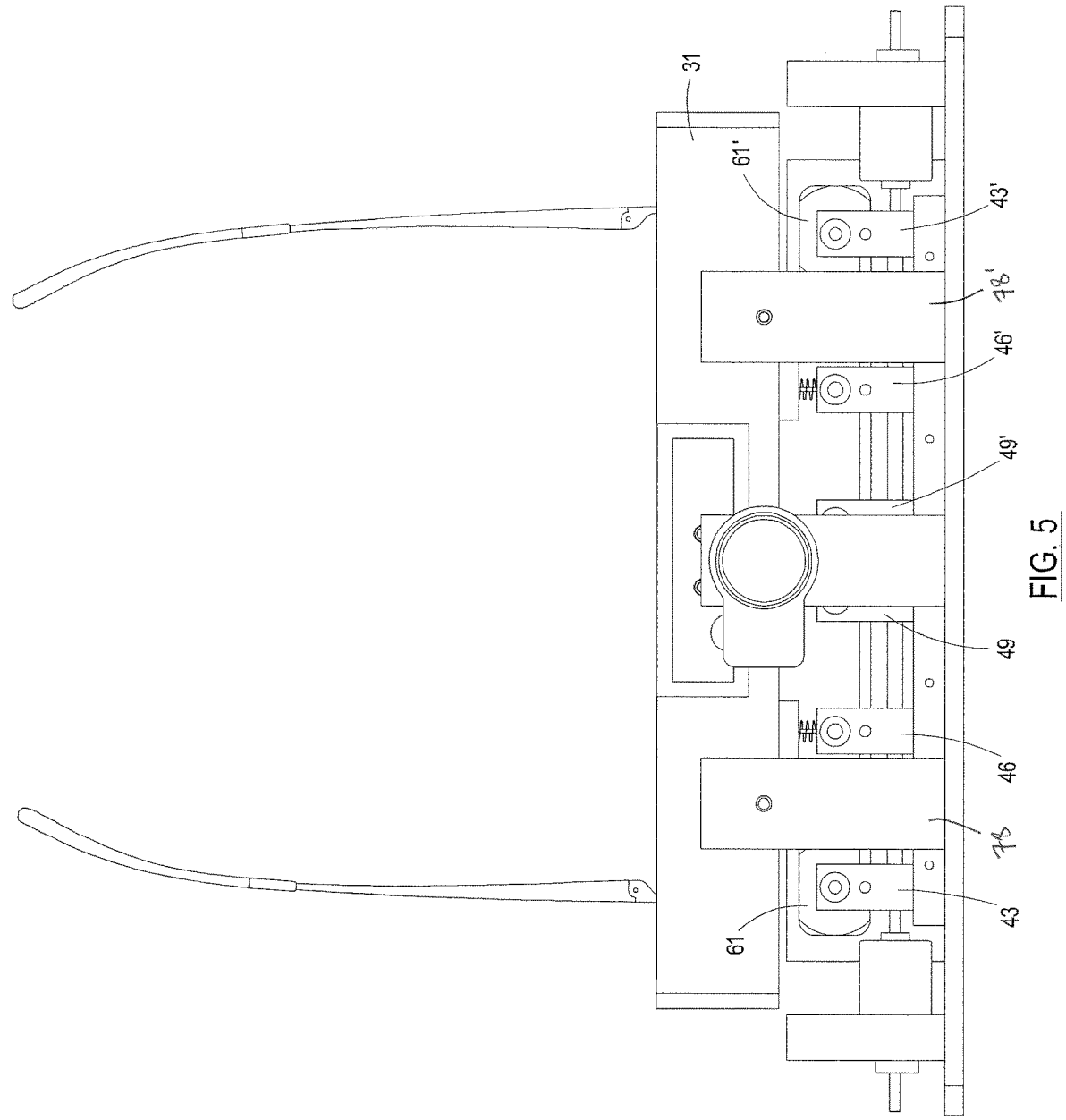
FIG. 5 is a front elevational view of the embodiment of FIG. 4
Figure 6:
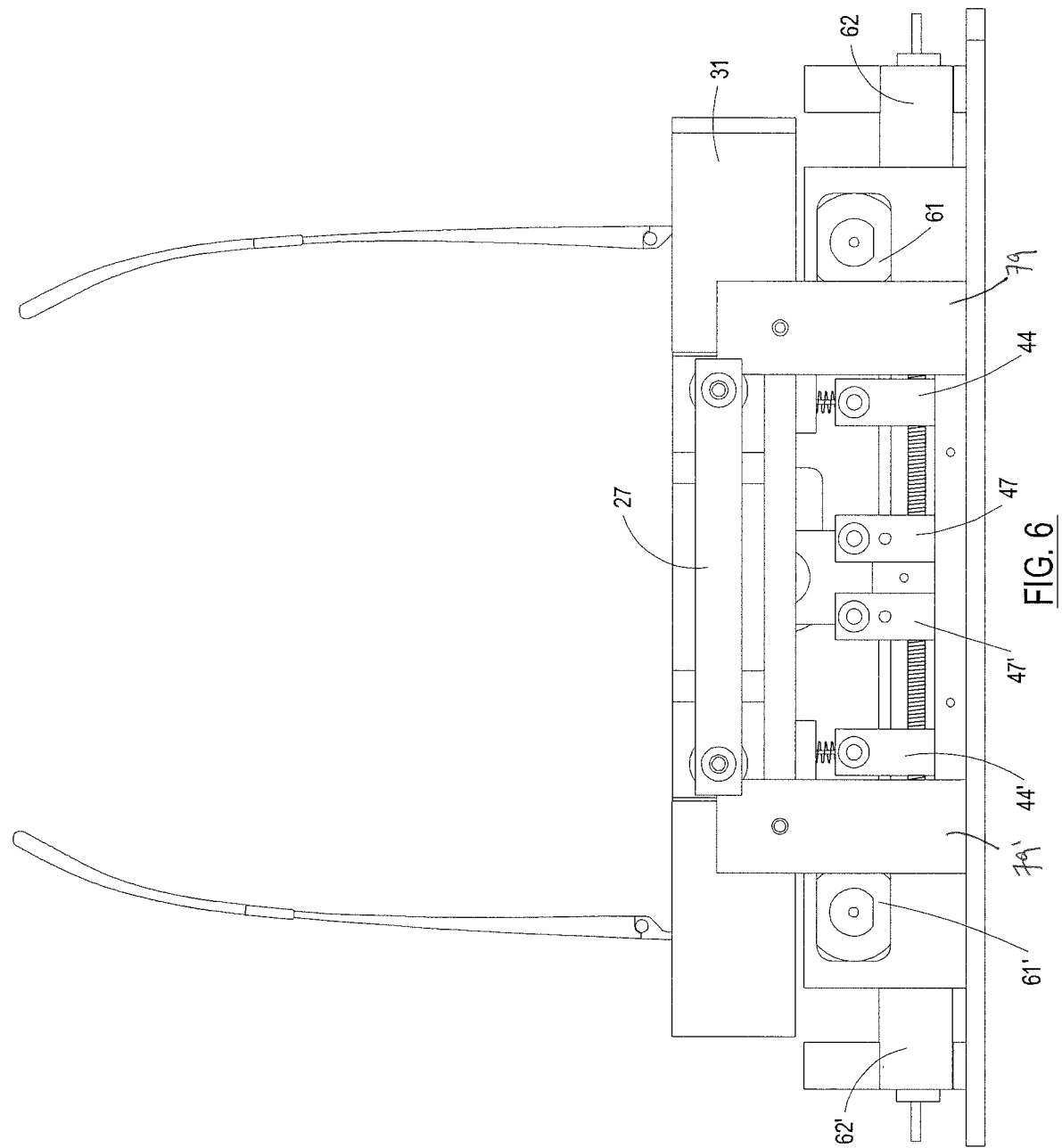
FIG. 6 is a rear elevational view of the embodiment of FIG. 4.
Figure 7:
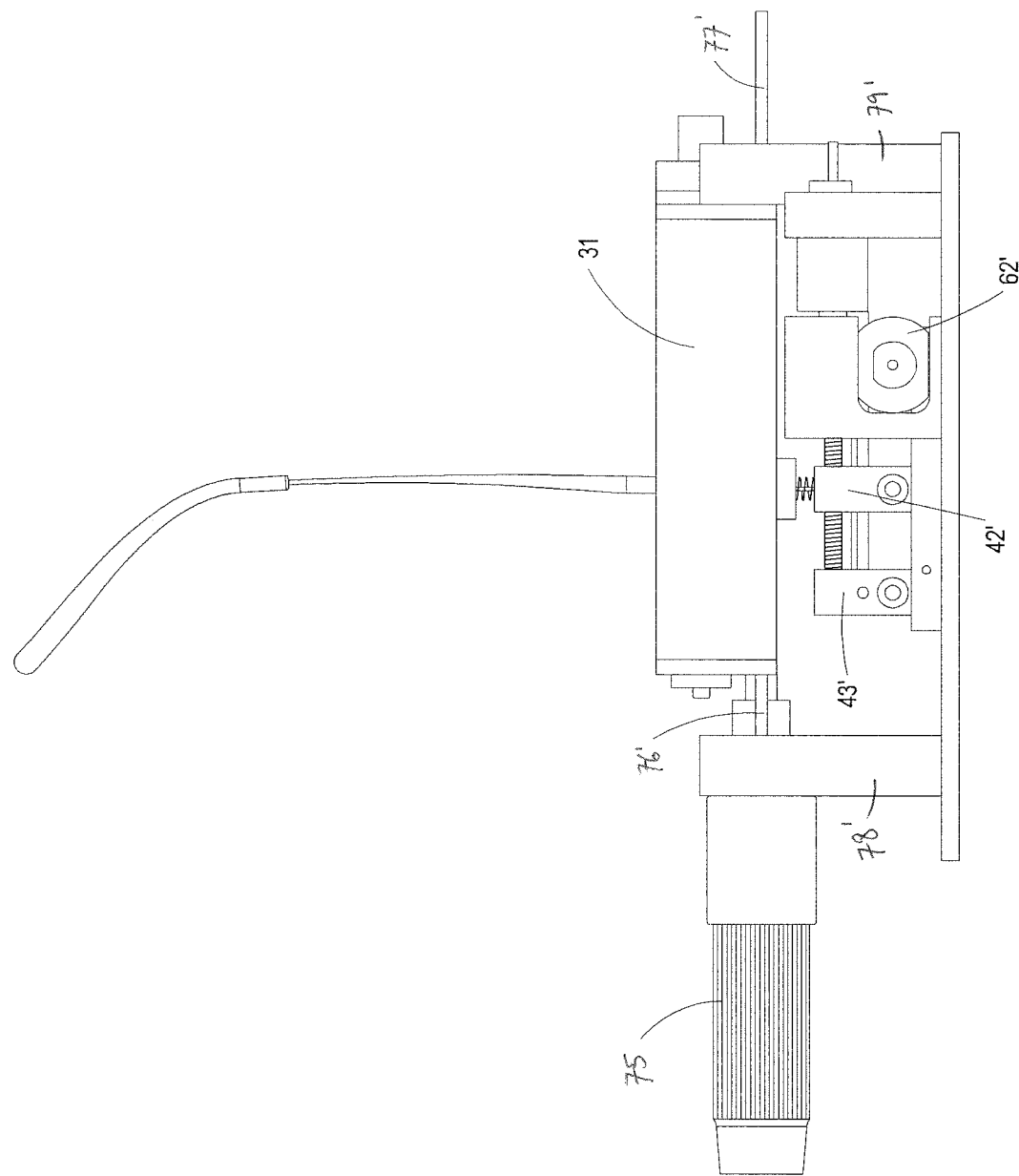
FIG. 7 is a side elevational view of the embodiment of FIG. 4.
Figure 8:
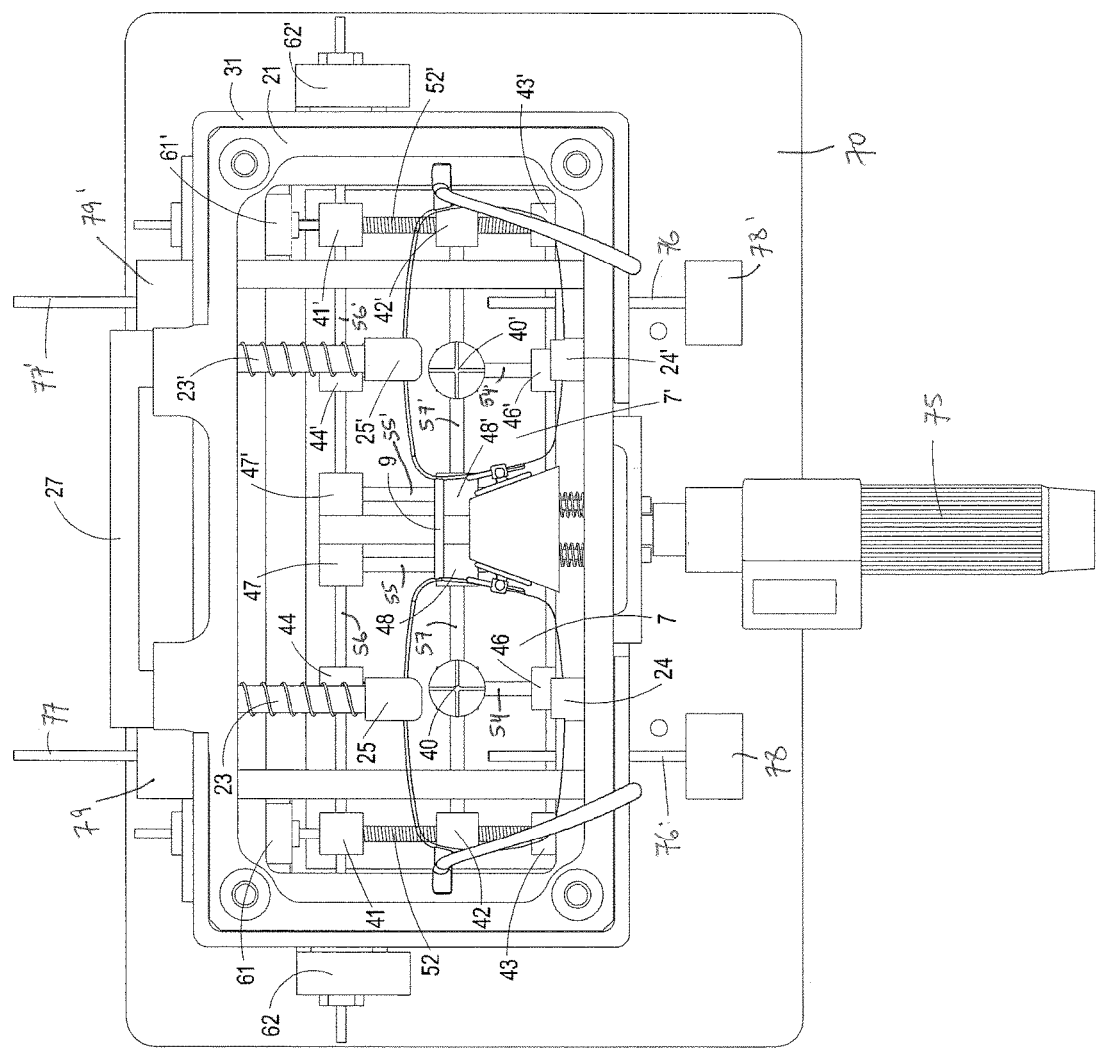
FIG. 8 is a top plan view of the embodiment of FIG. 4.

In the exemplary illustrated embodiment of FIGS. 1-8, it is seen that support frame 21 is sized so as to fit into a recessed section 35 of receptacle 31. In this illustrated exemplary embodiment, a plurality of springs, cushions or other compressible or deformable devices 32 are provided in the recessed section 35 for suspending support frame 21 in the recessed section 35 of receptacle 31, as shown in FIG. 4. As described more fully below, in this exemplary illustrated embodiment, downward pressure may be applied to support frame 21 to temporarily push it down into recess 35 thereby compressing springs 32 until pressure is released. This allows the lenses 7, 7' to come into temporary contact with one or more markers 40 (left) and 40' (right) in receptacle 31 that have been positioned according to measurements taken from a patient.

In the illustrated embodiment of FIGS. 1-8, markers 40, 40' are provided on movable mounts 45 (left) and 45' (right). Mounts 45, 45' may be moved from left to right (on the X axis), and from top to bottom (on the Y axis) within receptacle 31. The mounts 45, 45' may be positioned on the X axis, respectively, according to the measured left and right monocular pupillary distances of a patient. Similarly, mounts 45, 45' may be positioned on the Y axis, respectively, according to the measured left and right segment heights of a patient. Movement of mounts 45, 45' may be accomplished using any suitable X-Y orientation mechanism including without limitation any of those described herein. If necessary, mounts 45, 45' (or the entire support frame 21) may be further moved along the Y axis to compensate for the thickness of the frame into which the lenses are deployed. Once the markers 40, 40' are properly positioned, pressure may be applied to support frame 21 to move frame 9 and lenses 7, 7' downward, bringing lenses 7, 7' into contact with markers 40, 40' to place temporary marks thereon.

It is to be appreciated that in some embodiments, markers 40, 40' may be mounted on springs, solenoids or other devices which urge or cause the markers 40, 40' to move in an upward or vertical direction (along the Z axis) in order to bring markers 40, 40' into contact with the lenses 7, 7' to place temporary marks thereon.

In the illustrated embodiment of FIGS. 1-8, mounts 45, 45' are each slidably supported on at least one horizontally oriented rod 57 (left) and 57' (right) along the X axis, and also slidably supported by at least one perpendicularly oriented rod 54 (left) and 54' (right) along the Y axis, such that mounts 45, 45' may be moved in the X and Y directions, respectively, by sliding along rods 57, 57' and 54, 54'.

In the illustrated embodiment of FIGS. 1-8, movement along the X axis is accomplished as follows: each of rods 54, 54' is attached at one end to a support block 44 (left) and 44' (right), and at the opposite end to a different support block 46 (left) and 46' (right). Each support block 46, 46' is slidably mounted along a rod 58 (left) and 58' (right), the support rods 58, 58' being oriented perpendicularly to rods 54, 54'. The orientation of each rod 58, 58' is maintained using fixed-position blocks (43, 43' and 49, 49') located at opposite ends of each rod 58, 58'. Each support block 44, 44' includes a threaded bore through which a threaded rod 51 (left) and 51' (right) has been deployed. The orientation of threaded rods 51, 51' along the X axis is maintained using fixed-position blocks (41, 41' and 47, 47') located at opposite ends of each rod 51, 51' as well as parallel rods 56, 56', the fixed position blocks (41, 41' and 47, 47') allow rods 51, 51' to rotate without themselves traveling in either direction. Rotational movement is imparted to each of threaded rods 51, 51' by motors 62 (left) and 62' (right). This rotational movement causes each support block 44, 44' to move along the X axis, which also moves rods 54, 54' along the X axis thereby also moving each marker support 45, 45' along the X axis, with clockwise rotation causing linear movement in one direction, and counter-clockwise rotation causing linear movement in the opposite direction. It is to be appreciated that by precisely rotating each motor 62, 62' that each marker support 45, 45' may be moved to a precise location on the X axis for positioning each marker 40, 40' according to the left and right monocular pupillary distances of a patient.

In the illustrated embodiment of FIGS. 1-8, movement along the Y axis is accomplished as follows: each of rods 57, 57' is attached at one end to a movable support block 42 (left) and 42' (right), and at the opposite end to a movable support block 48 (left) and 48' (right). Each support block 48, 48' is slidably mounted along a rod 55 (left) and 55' (right), the support rods 55, 55' being oriented perpendicularly to rods 57, 57'. The orientation of each rod 55, 55' is maintained using fixed-position blocks (47, 47' and 49, 49') located at opposite ends of each rod 55, 55'. Each support block 42, 42' includes a threaded bore through which a threaded rod 52 (left) and 52' (right) has been deployed. The orientation of threaded rods 52, 52' along the Y axis is maintained using fixed-position blocks (41, 41' and 43, 43') located at opposite ends of each rod 52, 52' as well as parallel rods 53, 53' the fixed-position blocks (41, 41' and 43, 43') allowing rods 52, 52' to rotate without themselves traveling in either direction. Rotational movement is imparted to each of threaded rods 52, 52' by motors 61 (left) and 61' (right). This rotational movement causes each support block 42, 42' to move along the Y axis, which causes each rod 57, 57' to also move along the Y axis, in turn causing each marker support 45, 45' to move along the Y axis with clockwise rotation causing linear movement in one direction, and counter-clockwise rotation causing linear movement in the opposite direction. It is to be appreciated that by precisely rotating each motor 61, 61' that each support 45, 45' may be moved to a precise location on the Y axis for positioning each marker 40, 40' according to the left and right segment heights of a patient.

It is to be appreciated that the exemplary 9-block configuration of each side of the illustrated embodiment of FIGS. 1-8 (e.g., blocks 41-49 on the left side) provides four fixed-position blocks (41, 43, 47 and 49), two blocks that are movable along the X axis (44 and 46), and two blocks that are movable along the Y axis (42, 48), thereby allowing one block 45 to be easily and precisely moved along both the X and Y axes.

In alternative embodiments, the primary mount for each marker 40 may itself include a first threaded bore along the X axis, and a second threaded bore along the Y axis, with threaded rods deployed therein, such that rotation of the threaded rods causes the primary mount to move in the X and Y directions. Direct imparting of such rotational movement requires that the imparting members themselves (motors or micrometers) be movable along the other axis. In particular, the first motor imparting motion along the X axis must itself be able to move along the Y axis as the second motor imparts motion along the Y axis; and the second motor imparting motion along the Y axis must itself be able to move along the X axis as the first motor imparts motion along the X axis. Accordingly, in such embodiments, the motion imparting members (motors) may themselves be located on rods, tracks or other orientating structures to keep them on the applicable axis.

In manual systems, precise rotation of rods 51, 51' and 52, 52' may be accomplished using micrometers. In electronic systems, this rotation is accomplished using motors (preferably step motors) that are capable of precisely moving mounts 45, 45' according to the patient's optical measurements (left and right monocular pupillary distances, and left and right segment heights).

In electronic embodiments of the invention, a patient's left and right monocular pupillary distances, the patient's left and right segment heights, and the frame height (if applicable) may be input by a user through an interface to an electronic control system. The electronic control system may display these measurements to the user on a monitor and/or at the receptacle. The system uses the measurements to rotate rods 51, 51' and 52, 52' to move the mounts 45, 45' into positions reflecting these measurements for use in marking the lenses.

As noted previously, in some cases the thickness of the frame (frame height) need not be taken into account when marking lenses, for example, without limitation, if the particular frame design has no support structure underneath the lenses. However, in most cases, the frame height must be considered. In the illustrated embodiment of FIGS. 1-8, the thickness of the frame may be compensated for using a separate micrometer or motor 75 which moves the entire receptacle 31 containing the support frame 21 along the Y axis relative to the marker moving mechanisms which may or may not be mounted to base 70. This motion is facilitated and guided by rods 76 and 77 which slidably support receptacle 31 so that it may be moved along the Y axis. Rods 76 and 77 may be slidably mounted to blocks 78 and 79 which are attached to said base 70. It is to be appreciated that in the illustrated embodiment of FIGS. 1-8, markers 40, 40' are first moved into position according to a patient's left and right monocular pupillary distances, and the patient's left and right segment heights; then, if the frame height is to be considered, the entire receptacle 31 may be moved down along the Y axis the distance of the frame height using a micrometer or motor 75, so that the demo lenses may be marked (and the final lenses created) according to their actual positions in the frame chosen by the patient.

Alternatively, the additional motor 75 and supports 76, 77 may be eliminated, and the frame height may simply be added to the left and right segment heights when moving markers 40, 40' in the Y direction in order to compensate for the frame height.

As with the other measurements, in an electronic controlled system, the frame height may be input by a user, and may be displayed at the user interface and at the receptacle.

Figure 13:
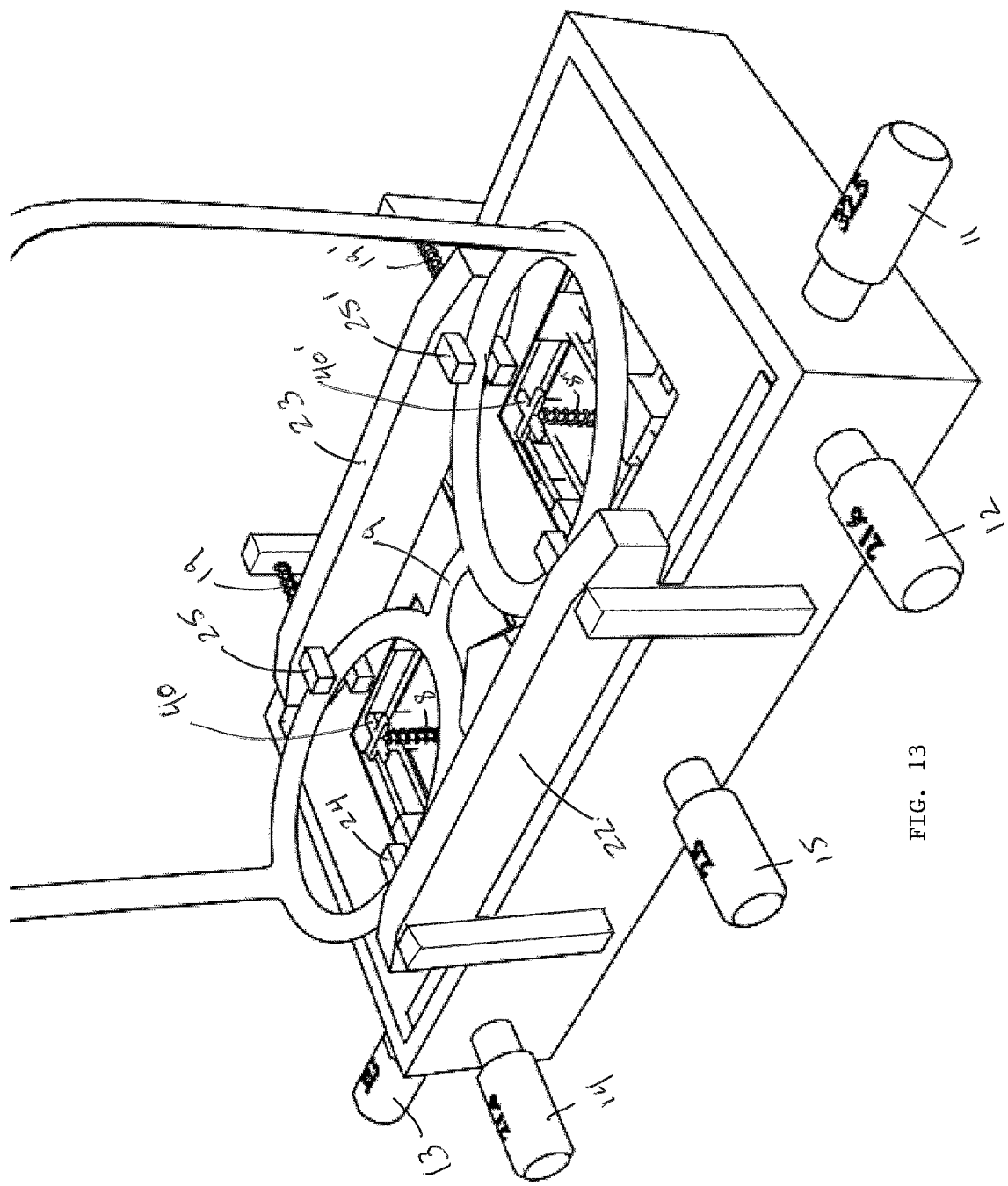
FIG. 13 is a perspective view of the embodiment of FIG. 12 showing a set of eyeglass frames mounted therein.
Figure 14:
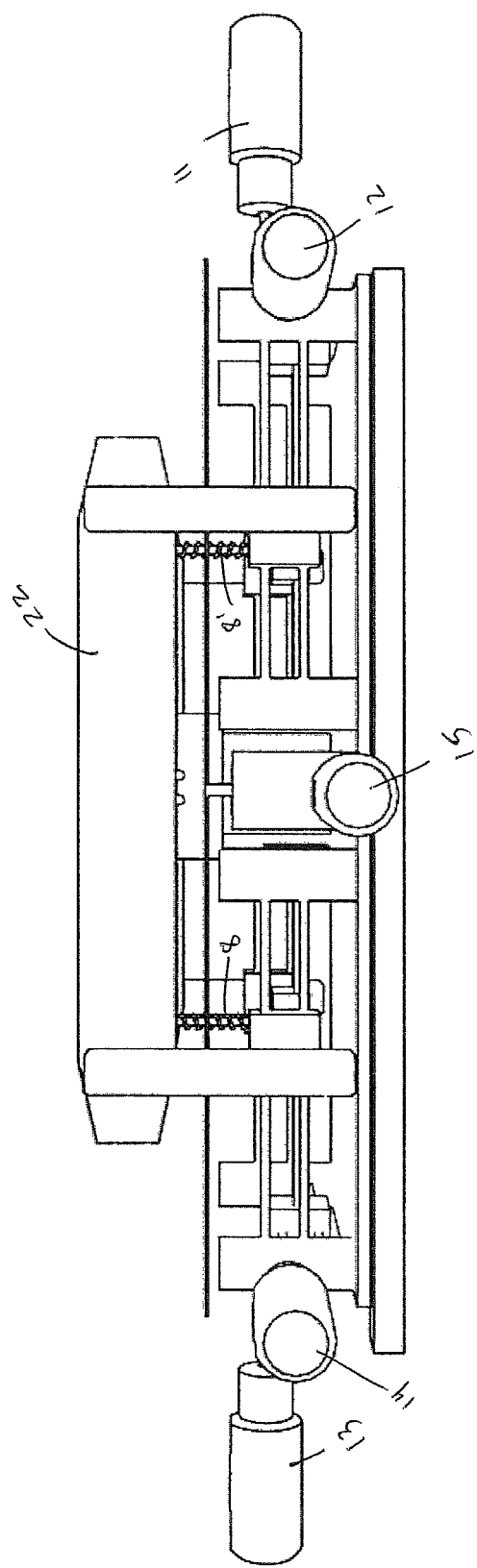
FIG. 14 is a front view of the embodiment of FIG. 12.
Figure 15:
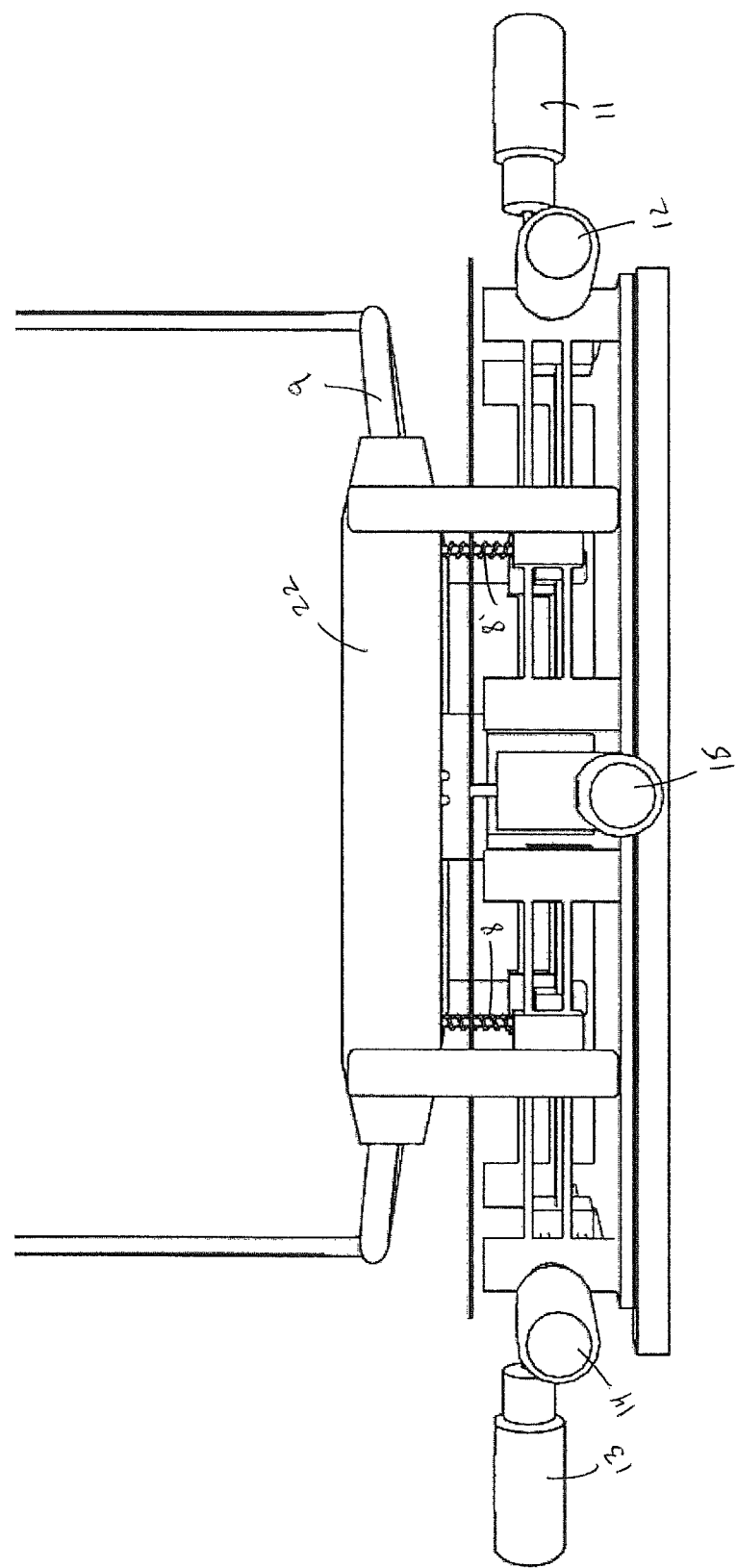
FIG. 15 is another front view of the embodiment of FIG. 12 having a set of eyeglass frames mounted therein.
Figure 16:
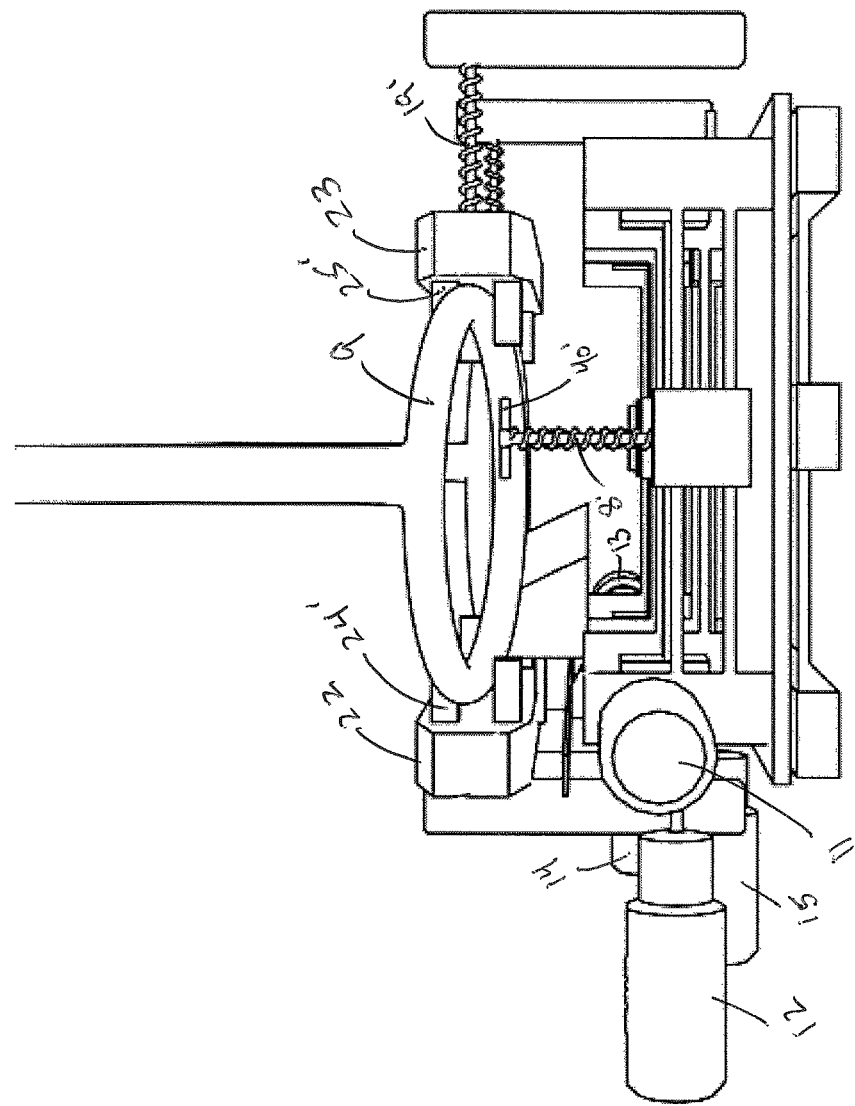
FIG. 16 is a side view of the embodiment of FIG. 12.

Referring to the embodiment of the invention shown in FIGS. 12-17, it is seen that this exemplary embodiment includes an open-ended receptacle or compartment 10 for receiving an eyeglass frame 9 having demo lenses 7, 7' mounted therein. The frames may be held in position by frictional contact with one or more walls 22, 23 of the compartment, or they may be clamped in place. In the illustrated exemplary embodiment of FIGS. 12-17, a movable upper wall 23 and a fixed-position lower wall 22 are provided. In this exemplary embodiment, upper wall 23 is urged toward the interior of compartment 10 by springs 19 and 19'. The force provided by springs 19, 19' allows upper wall 23 to hold the eyeglass frame 9 in place against lower wall 22. A set of upper guides 25, 25' engage the upper edges of eyeglass frame 9, and a set of lower guides 24, 24' engage the lower edges of eyeglass frame 9, as shown in FIG. 13 to further hold the eyeglass frame 9 in place.

A mechanical structure is provided inside the compartment below the frames which supports two movable central structures 8 (left) and 8' (right), one for each lens. Markers 40 (left) and 40' (right) are provided on each central structure (shown with plus "+" signs in FIGS. 12, 13 and 17) which are used to mark the pupil location on each respective lens. In the illustrated embodiment of FIGS. 12-17, the movable structures 8, 8' are spring-loaded mechanisms that may be activated using one or more electronic or manual triggers. It is to be appreciated that solenoids or other motion imparting structures may be used to move structures 8 in an upward or vertical direction (along the Z axis) to mark the lenses.

In the illustrated embodiment of FIGS. 12-17, each central structure 8, 8' may be moved along both the X and Y axes using adjustable positioning members. The positioning members may have measuring indicia thereon, and in the illustrated embodiment of FIGS. 12-17 they are provided in the form of micrometers or the like. Two positioning members are provided for maneuvering the stamping unit below the right lens, one in the X direction, and the other in the Y direction; and two other positioning members are provided for maneuvering the stamping unit below the left lens, one in the X direction, and the other in the Y direction. A final positioning member 15 is provided in these embodiments for the maneuvering the entire eyeglass frame. It is to be appreciated that in other embodiments, some or all of the positioning members may be provided in the form of motors (e.g. step motors) that are controlled by an electronic system.

In the illustrated embodiment of FIGS. 12-17, for the right lens, a first positioning member 11 is provided to move the right marker 40' along the X axis, and a second positioning member 12 is provided to move the right marker 40' along the Y axis. In the illustrated embodiment of FIGS. 12-17, the measured right monocular pupillary distance is dialed or provided to the first positioning member 11, and the measured right segment height is dialed or provided to the second positioning member 12. Similarly, in the illustrated embodiment of FIGS. 12-17, for the left lens, a third positioning member 13 is provided to move the left marker 40 along the X axis, and a fourth positioning member 14 is provided to move the left marker 40 along the Y axis. In the illustrated embodiment of FIGS. 12-17, the measured left monocular pupillary distance is dialed or provided to the third positioning member 13, and the measured left segment height is dialed or provided to the fourth positioning member 14. Once these four measurements are used to move markers 40, 40' in this embodiment of the invention, the position of the markers 40, 40' relative to the mounted eyeglass frame 9 may then be adjusted using the fifth positioning member 15 which compensates for the thickness or height of the frame itself. In some embodiments, positioning member 15 moves compartment 10 along the Y axis relative to the marker positioning mechanisms to compensate for frame thickness; in other embodiments, positioning member 15 moves the marker positioning mechanisms along the Y axis relative to the compartment 10 to compensate for frame thickness. It is to be appreciated that positioning member 15 need not always be used if the selected eyeglass frame 9 has no thickness to be compensated for.

Figure 17:
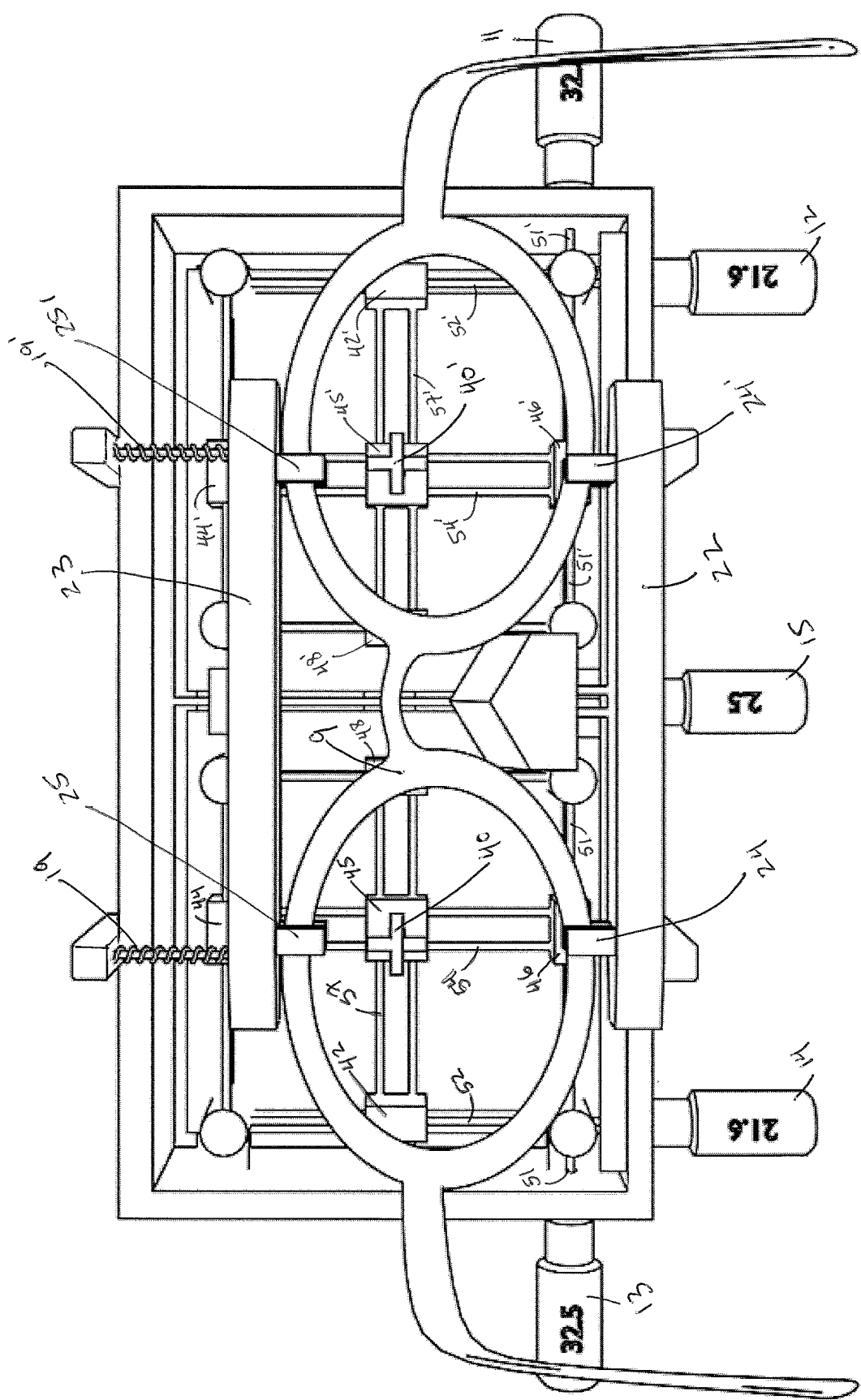
FIG. 17 is a top view of the embodiment of FIG. 12.
Figure 18:
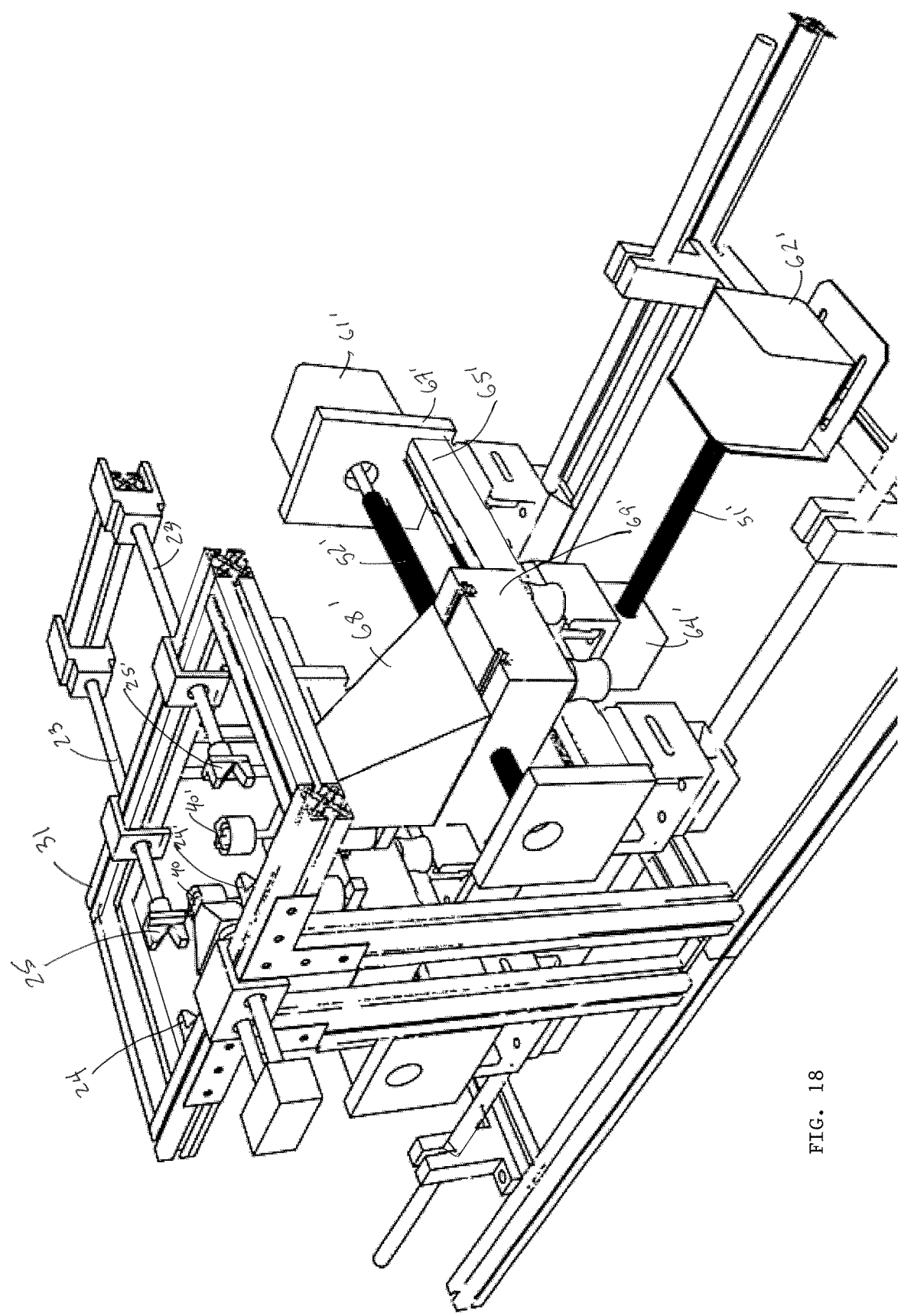
FIG. 18 is a perspective view of another alternative embodiment of the invention in an empty condition.

In the illustrated embodiment of FIGS. 12-17, and referring particularly to FIG. 17, movement of marker 40 for the left lens along the X axis is accomplished as follows: rotational movement is imparted using positioning member 13, which rotates threaded rod 51. Movable block 46 includes a threaded bore through which rod 51 is deployed. Rotation of rod 51 causes movable block 46 to move in one linear direction along the X axis with clockwise rotation, and to move in the opposite linear direction along the X axis with counter-clockwise rotation. This motion is transmitted from block 46 to support 45 through at least one rod 54 which extends between block 46 and support 45. Rod 54 may be supported at its opposite end by block 44. Movement of block 46 also moves marker 40 which is mounted thereon. Thus, as positioning member 13 is rotated, motion is imparted to marker 40 along the X axis. It is to be appreciated that similar movement of right marker 40' is accomplished by rotating positioning member 11 which transmits motion along the X axis through threaded rod 51' to block 46' and then through rod 54' to support 45' holding marker 40'.

In the illustrated embodiment of FIGS. 12-17, and referring particularly to FIG. 17, movement of marker 40 for the left lens along the Y axis is accomplished as follows: rotational movement is imparted using positioning member 14, which rotates threaded rod 52. Movable block 42 includes a threaded bore through which rod 52 is deployed. Rotation of rod 52 causes movable block 42 to move in one linear direction along the Y axis with clockwise rotation, and to move in the opposite linear direction along the Y axis with counter-clockwise rotation. This motion is transmitted from block 42 to support 45 through at least one rod 57 which extends between block 42 and support 45. Rod 57 may be supported at its opposite end by block 48. Movement of block 45 also moves marker 40 which is mounted thereon. Thus, as positioning member 14 is rotated, motion is imparted to marker 40 along the Y axis. It is to be appreciated that similar movement of right marker 40' is accomplished by rotating positioning member 12 which transmits motion along the Y axis through threaded rod 52' to block 42' and then through rod 57' to support 45' holding marker 40'.

It is to be appreciated that in other embodiments, different positioning structures may be provided, and they may be provided in different places, with the same purpose of being able to enter the measurements taken and mark the lenses in order to determine whether they measurements are accurate and usable.

It is also to be appreciated that in some embodiments, the positioning members may be movable members attached to rotatable handles which use a worm-and-gear apparatus to move the central structure. For example, a first handle may move the central member in the X plane, and a second handle may move the central member in the Y plane. In other embodiments, the positioning members may be slidable in the X and Y planes. It is to be appreciated that other suitable X-Y positioning apparatus may also be employed.

Measuring indicia may be provided on or associated with the positioning members, such that the central structures may be positioned on both the X and Y axis according to the measurements taken. It is to be appreciated that this positioning may be as precise as 1/10 mm (one tenth of a millimeter), to very precisely locate the pupil positions for a set of eyeglasses.

Another alternative embodiment of an apparatus of the invention is illustrated in FIGS. 24-30. In this exemplary embodiment, it is seen that a generally rectangular support frame 21 is provided which is designed to temporarily hold an eyeglass frame 9 having lenses 7, 7' mounted therein. In this illustrated exemplary embodiment, a plurality of springs, cushions or other compressible or deformable devices 32 are provided for suspending support frame 21 above a base 70. As described more fully below, in this exemplary illustrated embodiment, downward pressure may be applied to support frame 21 to temporarily push it down, thereby compressing springs 32 until pressure is released. This allows the eyeglass lenses 7, 7' to come into temporary contact with one or more markers 40 (left) and 40' (right) that have been positioned according to measurements taken from a patient.

In the embodiment of FIGS. 24-30, it is seen that an eyeglass frame 9 may be held in position by frictional contact with one or more walls or edges of the support frame 21, or frame 9 may be clamped in place. In the illustrated exemplary embodiment of FIGS. 24-30, and referring particularly to FIGS. 29-30, it is seen that a movable rear wall 23 and a fixed-position front wall 22 are provided. In this exemplary embodiment, rear wall 23 is urged toward the interior of frame 21 by springs 19. The force provided by springs 19 allows rear wall 23 to hold the eyeglass frame 9 in place against front wall 22. A first set of rear guides 25, 25' engage the upper edges of eyeglass frame 9, and a second set of front guides 24, 24' on front wall 22 engage the lower edges of eyeglass frame 9 to further hold the eyeglass frame 9 in place. A spring-loaded nosepiece 20 may be provided on front wall 22 to engage the nose or bridge of the eyeglass frames to center them in the support frame 21.

In the illustrated embodiment of FIGS. 24-30, markers 40, 40' are provided on movable mounts 45 (left) and 45' (right). Mounts 45, 45' may be moved from left to right (on the X axis), and from top to bottom (on the Y axis) on base 70. The mounts 45, 45' may be positioned on the X axis, respectively, according to the measured left and right monocular pupillary distances of a patient. Similarly, mounts 45, 45' may be positioned on the Y axis, respectively, according to the measured left and right segment heights of a patient. Movement of mounts 45, 45' may be accomplished using any suitable X-Y orientation mechanism including without limitation any of those described herein. If necessary, mounts 45, 45' (or the entire support frame 21) may be further moved along the Y axis to compensate for the thickness of the frame into which the lenses are deployed. Once the markers 40, 40' are properly positioned, pressure may be applied to support frame 21 to move frame 9 and lenses 7, 7' downward, bringing lenses 7, 7' into contact with markers 40, 40' to place temporary marks thereon.

In the illustrated embodiment of FIGS. 24-30, each lens marker may be moved along both the X and Y axes using adjustable positioning members. In the illustrated embodiments of FIGS. 24-30, two positioning members are provided for maneuvering the marking unit below the right lens, one in the X direction 11, and the other in the Y direction 12; and two other positioning members are provided for maneuvering the marking unit below the left lens, one in the X direction 13, and the other in the Y direction 14. A final positioning member 15 is provided in these embodiments for the maneuvering the entire frame 21 relative to base 70. It is to be appreciated that in other embodiments, some or all of the positioning members may be provided in the form of motors (e.g. step motors) that are controlled by an electronic system.

Figure 29:
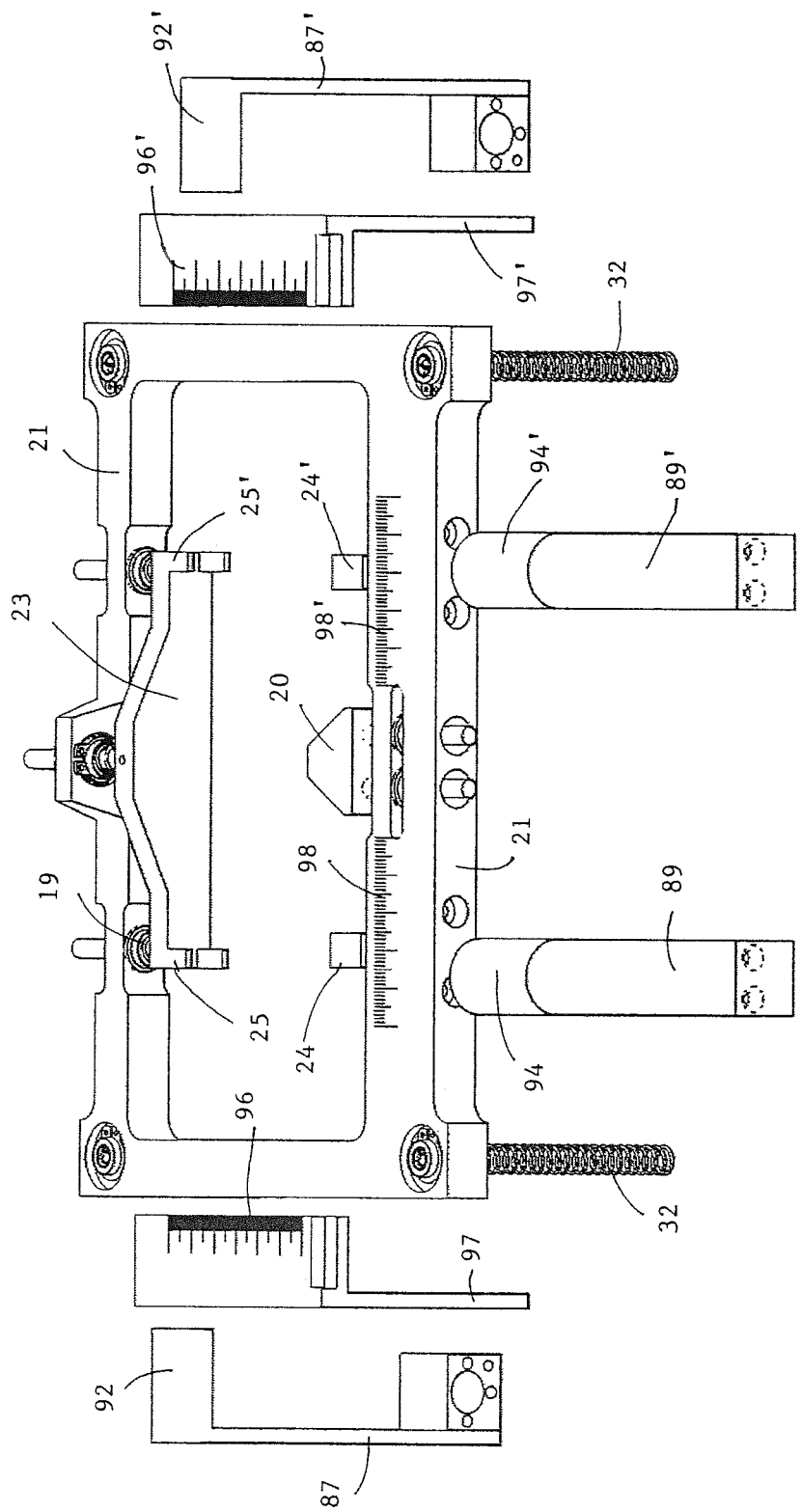
FIG. 29 is an exploded front view of a portion of the embodiment of FIG. 24.
Figure 30:
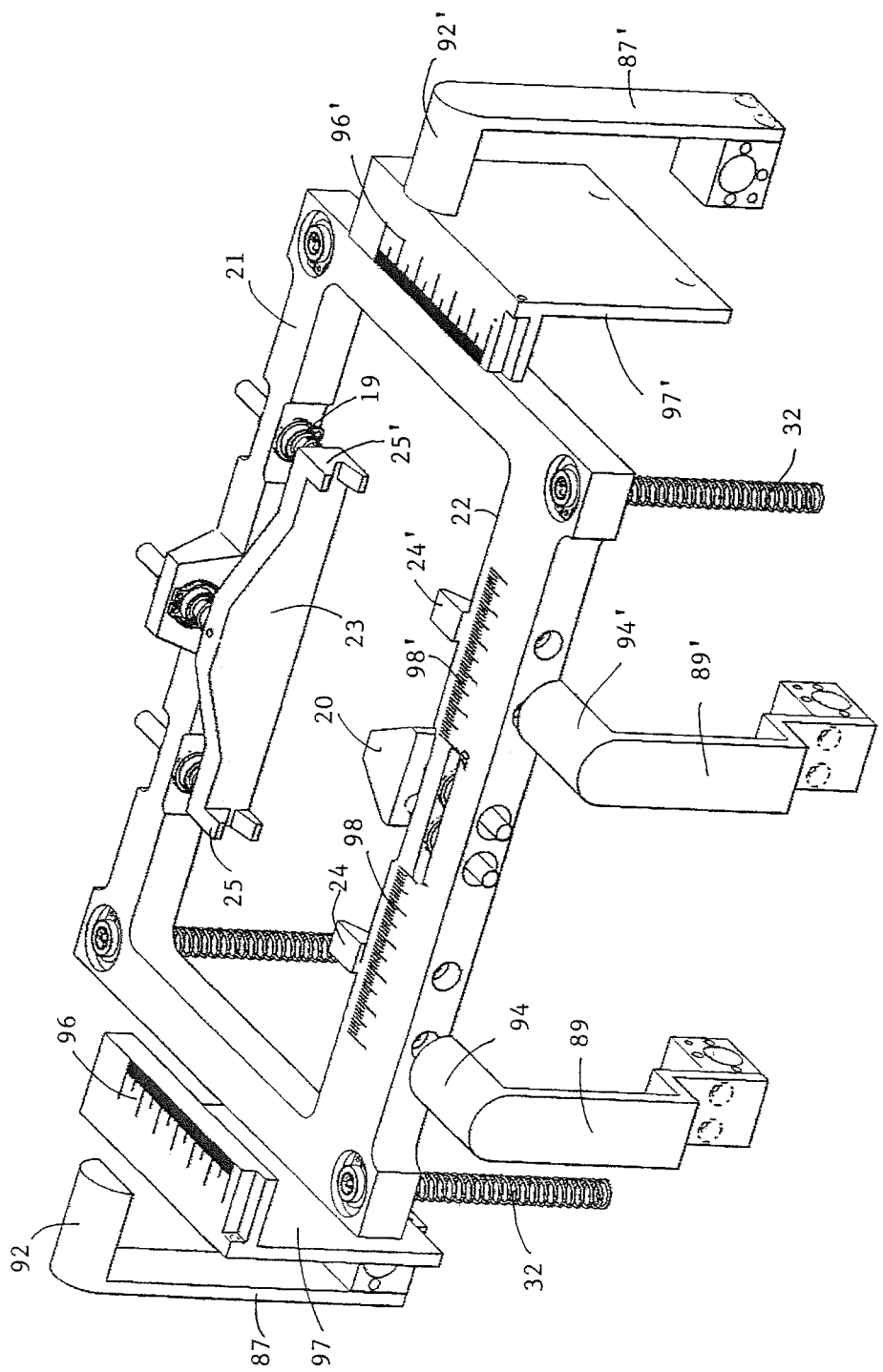
FIG. 30 is an exploded perspective view of a portion of the embodiment of FIG. 24.

In embodiments of the invention, the positioning members may be provided with measuring indicia for use in positioning the lens markers. Magnifying lenses or other means may also be provided to assist the user in seeing this indicia in order to precisely position the lens markers. As shown in the detail of FIGS. 29-30 measuring indicia 98, 98' may be provided on support frame 21 for use in positioning the markers 40, 40' along the X axis. These indicia 98, 98' may be enlarged using magnifying lenses 94, 94' mounted on supports 89, 89'. It is to be appreciated that when frame 21 is pushed down to mark the lenses, a gap is temporarily formed between measuring indicia 98 and magnifying lens 94, and between indicia 98' and lens 94'. Since the frame 21 is not moved downward for marking until after the markers 40, 40' have been positioned using indicia 98, 98' and lenses 94, 94', this temporary gap is of no consequence. Similarly, measuring indicia 96, 96' may be provided on members 97, 97' for use in positioning the markers 40, 40' along the Y axis. Members 97, 97' are mounted directly to base 70 and have portions that extend over frame 21. The indicia 96, 96' may be enlarged using magnifying lenses 92, 92' mounted on supports 87, 87'. Since the Y indicia are attached indirectly to base 70 (and not to frame 21), when frame 21 is pushed down to mark the lenses, there is no gap between the indicia and the lenses; instead, a gap is temporarily formed between frame 21 and the extensions of members 97, 97'.

In the illustrated embodiment of FIGS. 24-30, for the right lens, a first positioning member 11 is provided to move the right marker 40' along the X axis, and a second positioning member 12 is provided to move the right marker 40' along the Y axis. In the illustrated embodiment of FIGS. 24-30, the measured right monocular pupillary distance is dialed or provided to the first positioning member 11 using measuring indicia 98', and the measured right segment height is dialed or provided to the second positioning member 12 using measuring indicia 96'. Similarly, in the illustrated embodiment of FIGS. 24-30, for the left lens, a third positioning member 13 is provided to move the left marker 40 along the X axis, and a fourth positioning member 14 is provided to move the left marker 40 along the Y axis. In the illustrated embodiment of FIGS. 24-30, the measured left monocular pupillary distance is dialed or provided to the third positioning member 13 using measuring indicia 98, and the measured left segment height is dialed or provided to the fourth positioning member 14 using measuring indicia 96. Once these four measurements are used to move markers 40, 40' in this embodiment of the invention, the position of the markers 40, 40' relative to the mounted eyeglass frame 9 may then be adjusted using the fifth positioning member 15 which compensates for the thickness or height of the frame itself. In some embodiments, positioning member 15 moves frame 21 along the Y axis relative to the base to compensate for frame thickness; in other embodiments, positioning member 15 moves the marker positioning mechanisms along the Y axis relative to the frame 21 to compensate for frame thickness. It is to be appreciated that positioning member 15 need not always be used if the selected eyeglass frame 9 has no thickness to be compensated for. Once the positions of the markers 40, 40' have been established, frame 21 may be pushed downward against the upward urgings of springs 32 causing lenses 7, 7' to come into contact with markers 40, 40' to mark the dialed-in positions on the lenses themselves.

Figure 24:
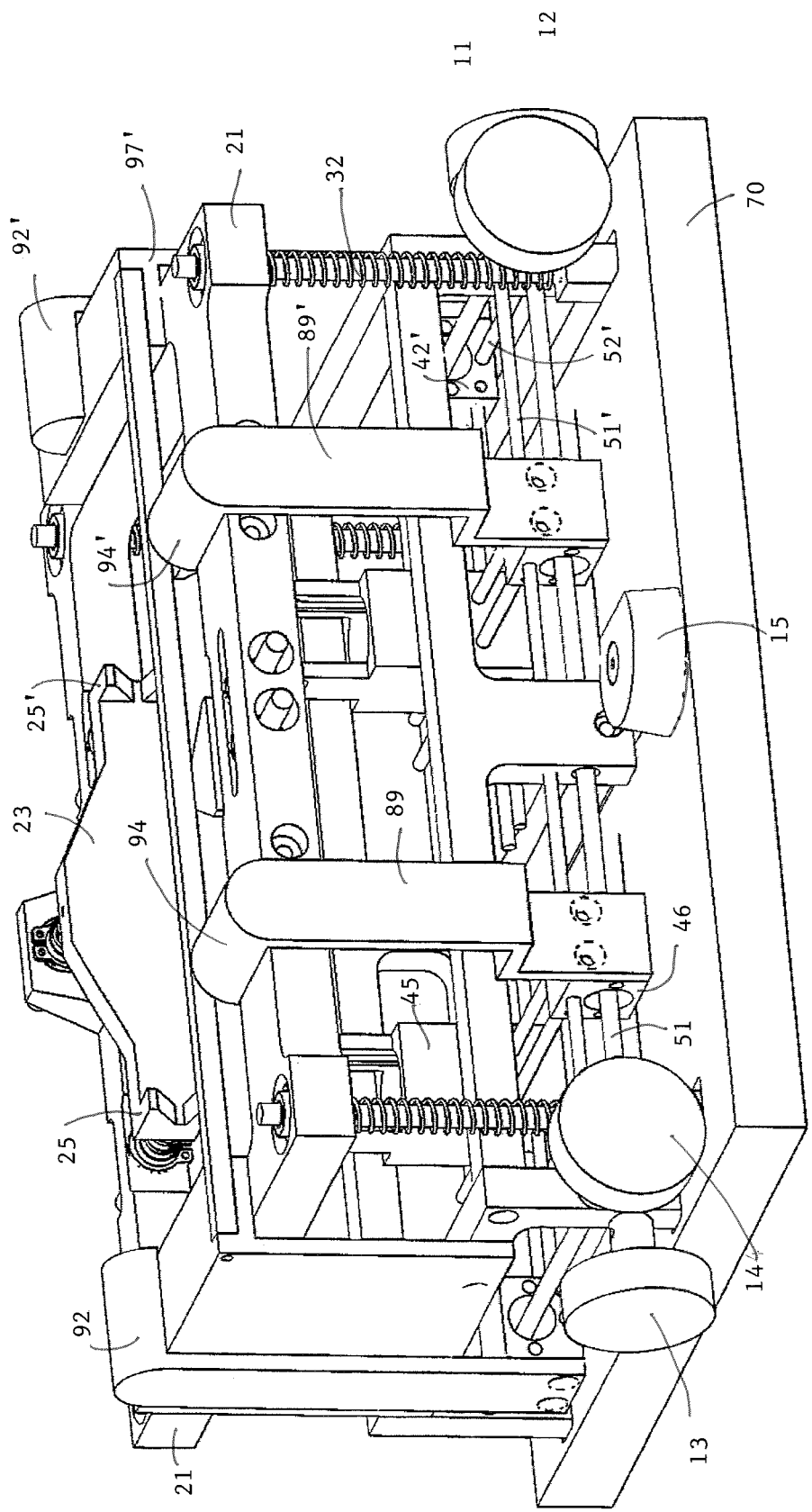
FIG. 24 is a front perspective view of an alternative embodiment of the invention in an empty condition.
Figure 25:
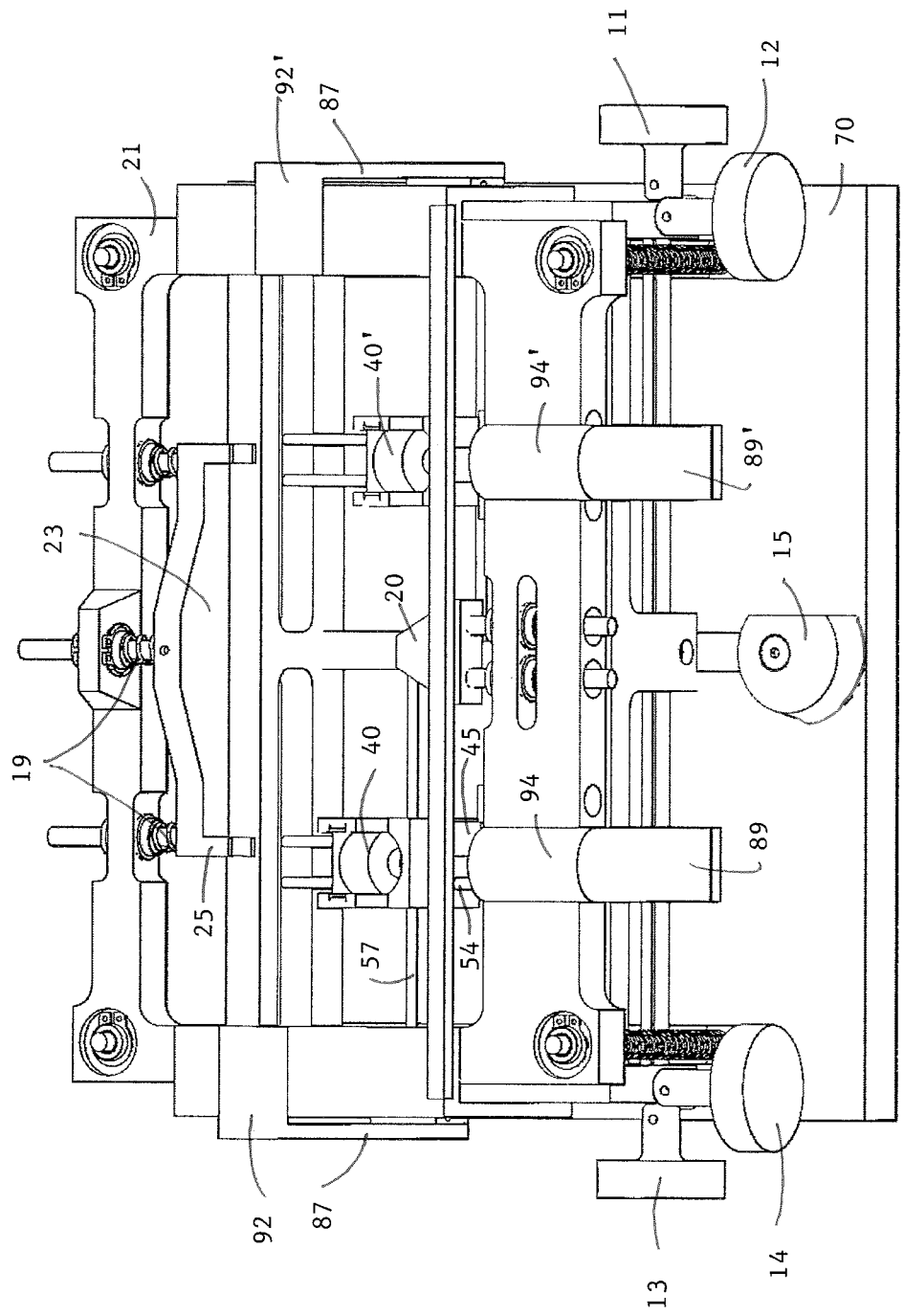
FIG. 25 is a top perspective view of the embodiment of FIG. 24.
Figure 26:
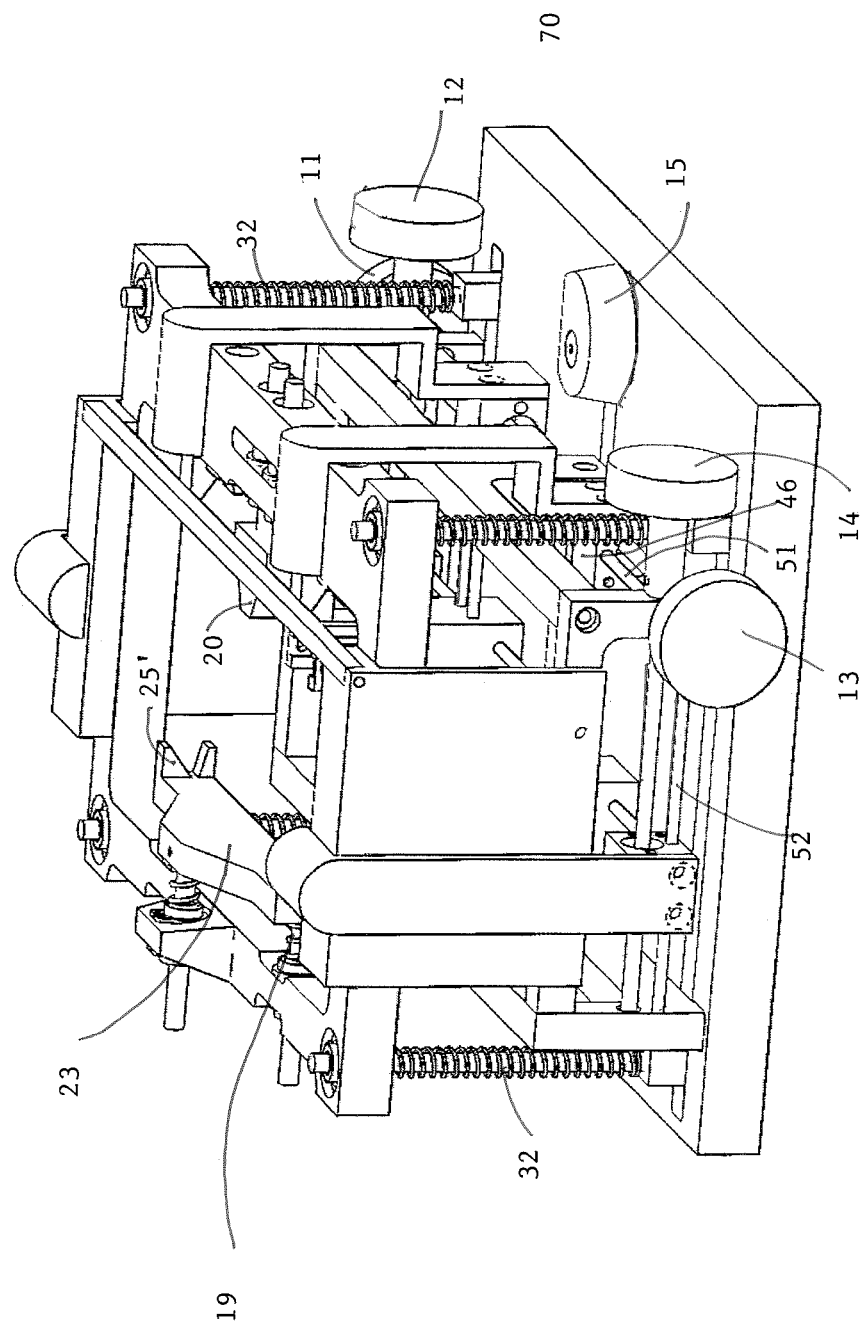
FIG. 26 is a left side perspective view of the embodiment of FIG. 24.
Figure 27:
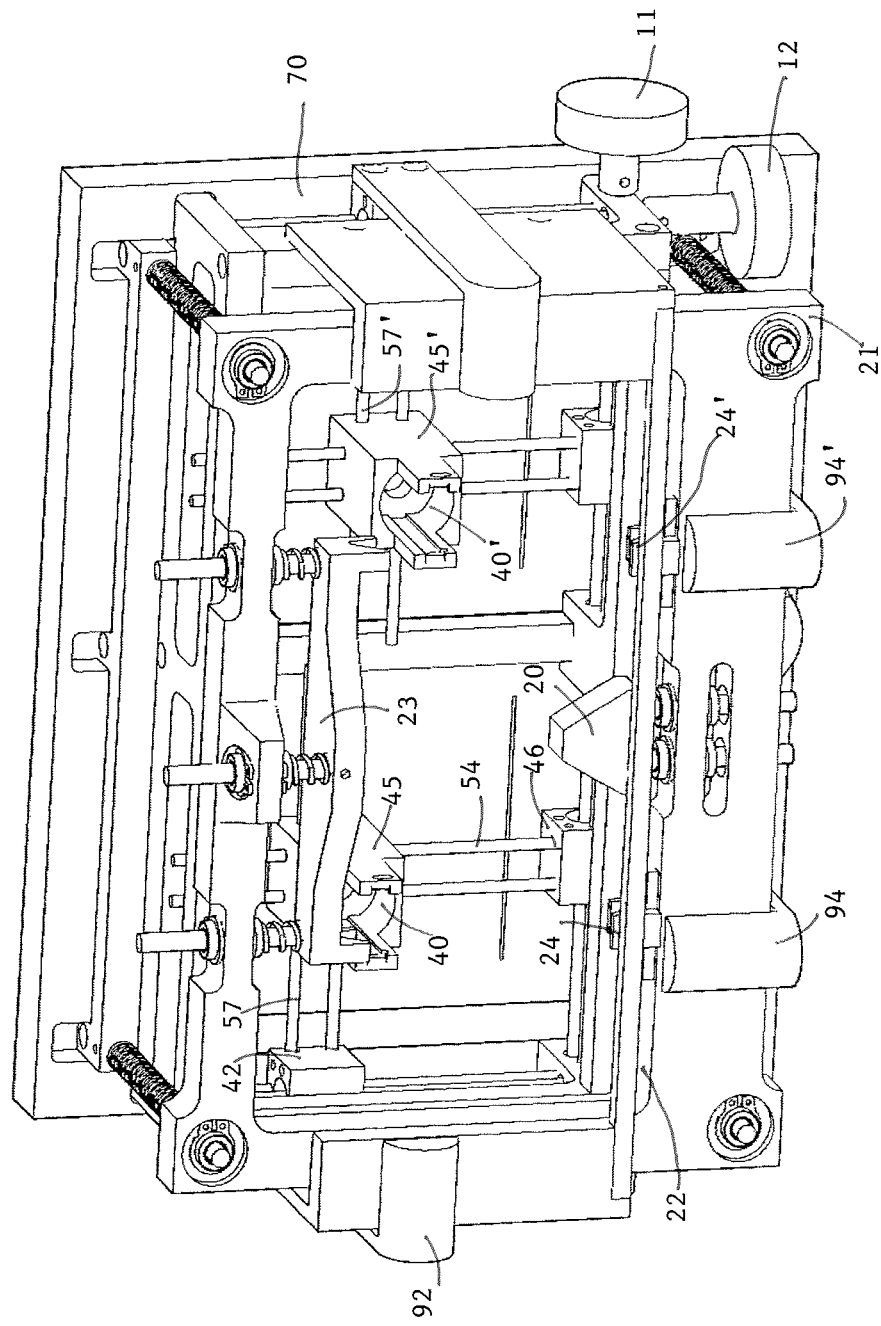
FIG. 27 is another top perspective view of the embodiment of FIG. 24.
Figure 28:
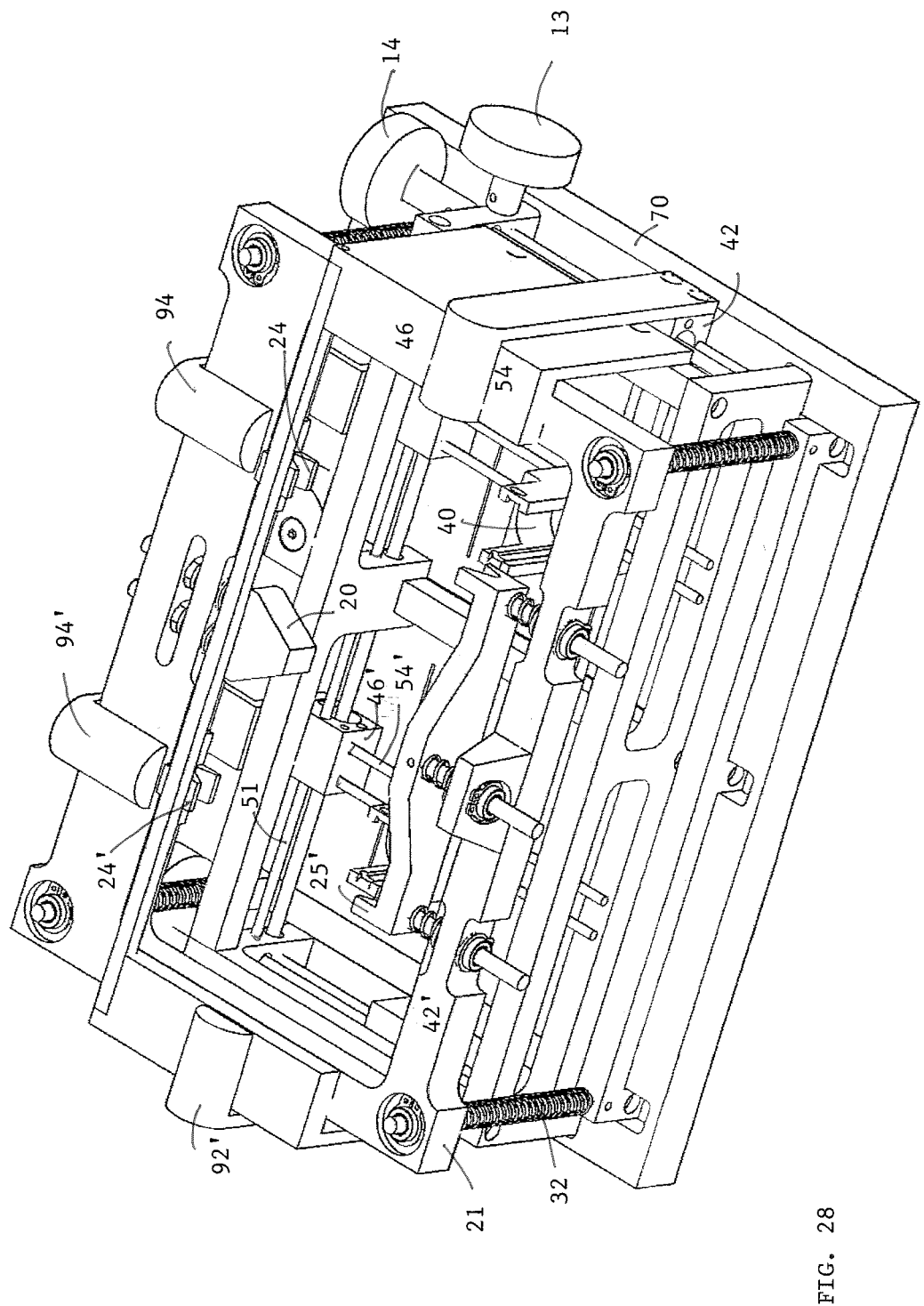
FIG. 28 is a rear perspective view of the embodiment of FIG. 24.

In the illustrated embodiment of FIGS. 24-30, and referring particularly to FIGS. 24 and 27, it is seen that movement of marker 40 for the left lens along the X axis is accomplished as follows: rotational movement is imparted using positioning member 13, which rotates threaded rod 51. Movable block 46 includes a threaded bore through which rod 51 is deployed. Rotation of rod 51 causes movable block 46 to move in one linear direction along the X axis with clockwise rotation, and to move in the opposite linear direction along the X axis with counter-clockwise rotation. This motion is transmitted from block 46 to support 45 through at least one rod 54 which extends between block 46 and support 45. Movement of block 45 also moves marker 40 which is mounted thereon. Thus, as positioning member 13 is rotated, motion is imparted to marker 40 along the X axis. Measuring indicia 98 for tracking the X-axis position of left marker 40 may be provided on frame 21 below a lens 94 which may be magnified. This allows the user to precisely position marker 40 along the X-axis when turning knob 13. It is to be appreciated that similar movement of right marker 40' is accomplished by rotating positioning member 11 which transmits motion along the X axis through threaded rod 51' to block 46' and then through rod 54' to support 45' holding marker 40'; and that precise positioning may be accomplished by utilizing the measuring indicia 98' below lens 94'.

In the illustrated embodiment of FIGS. 24-30, and referring particularly to FIGS. 24 and 27, it is seen that movement of marker 40 for the left lens along the Y axis is accomplished as follows: rotational movement is imparted using positioning member 14, which rotates threaded rod 52. Movable block 42 includes a threaded bore through which rod 52 is deployed. Rotation of rod 52 causes movable block 42 to move in one linear direction along the Y axis with clockwise rotation, and to move in the opposite linear direction along the Y axis with counter-clockwise rotation. This motion is transmitted from block 42 to support 45 through at least one rod 57 which extends between block 42 and support 45. Movement of block 45 also moves marker 40 which is mounted thereon. Thus, as positioning member 14 is rotated, motion is imparted to marker 40 along the Y axis. Measuring indicia 96 for tracking the Y-axis position of left marker 40 may be provided on a bracket 97, 97' below a lens 92 which may be magnified. This allows the user to precisely position marker 40 along the X-axis when turning knob 14. It is to be appreciated that similar movement of right marker 40' is accomplished by rotating positioning member 12 which transmits motion along the Y axis through threaded rod 52' to block 42' and then through rod 57' to support 45' holding marker 40'; and that precise positioning may be accomplished by utilizing the measuring indicia 96' below lens 92'.

In the illustrated embodiment of FIGS. 24-30, support frame 21 is urged upward away from base 70 by springs 32 which are shown at the four corners of frame 21, but which may be provided at any suitable locations. Once markers 40, 40' have been moved into position, frame 21 may be pushed down toward base 70. This movement will move eyeglass frame 9 down when it is engaged with guides 24, 24' and 25, 25', bringing lenses 7, 7' into contact with markers 40, 40'. It is to be appreciated that magnifying lenses 92, 92' is provided on support members 87, 87' and that support members 87, 87' are fixedly attached to frame 70 and to brackets 97, 97'. Accordingly downward movement of frame 21 will create a temporary gap between frame 21 and brackets 97, 97'. Downward movement will also create a temporary gap between measuring indicia 98, 98' on frame 21 and lenses 94, 94'. Once frame 21 is released, springs 32 will urge frame 21 upward, closing these gaps. The eyeglass frame 9 and lenses 7, 7' may then be removed and taken to the patient.

It is to be appreciated that although the embodiments illustrated in FIGS. 12-17 and 24-30 show manual systems for inputting and checking a patient's facial measurements, that the scope of the invention includes automated and/or electronic systems for accomplishing the same purpose. For example, and without limitation, the positioning members may be motorized or otherwise electronically operated, the positioning members may receive electronic input for positioning, the positioning members may provide digital measurements or readouts, the positioning members may provide electronic outputs that are received via wired or wireless means by a computer or other device, the stamping or marking unit may be electronically triggered, etc.

In some electronically controlled embodiments, a first user interface may be provided at a first location where patient measurements may be taken (e.g., in a patient waiting room or at a station in a showroom) such that a practitioner may input the measurements as they are taken; and a second user interface may be provided in a second location where the marking unit is located (e.g., in a shop room or back room) such that measurements or adjustments thereof may also be input at the marking unit. Each of the first user interface and/or the second user interface may be operable to input the patient's measurements and control the marking unit. In such embodiments, the first user interface may be in wired or wireless communication with at least one of the marking unit, a computer device associated with the marking unit, and the second user interface; the second user interface being in wired or wireless electronic communication with the marking unit and a computer device associated with the marking unit. In other electronically controlled embodiments, a single user interface may be provided at a location near the marking unit and be in wired or wireless communication with at least one of the marking unit and a computer device associated with the marking unit. In electronically controlled embodiments, wireless communication may include at least one of a Wi-Fi, Bluetooth, Infrared, Cellular, and other similar wireless communication system.

Figure 19:
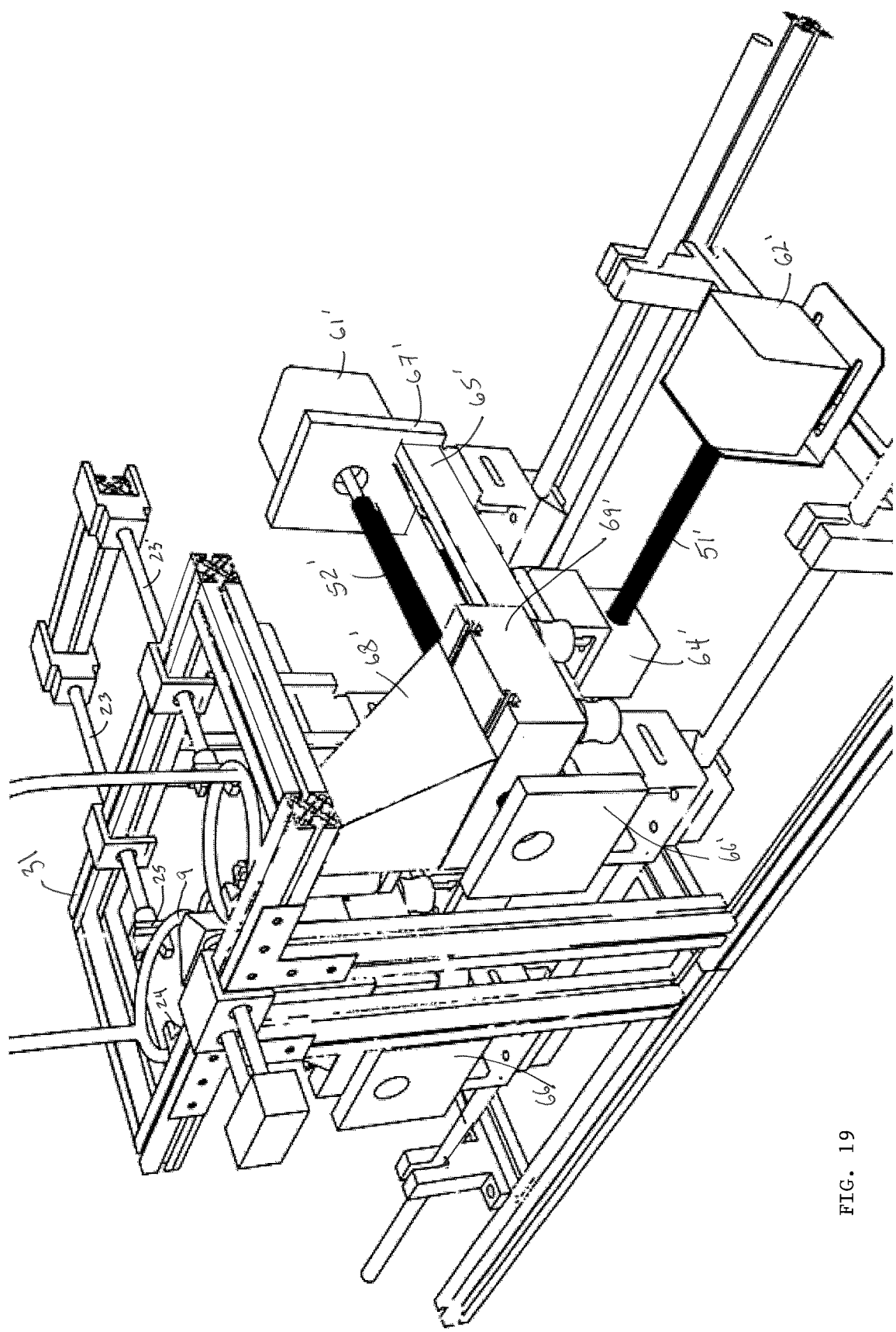
FIG. 19 is a perspective view of the embodiment of FIG. 18 showing a set of eyeglass frames mounted therein.
Figure 20:
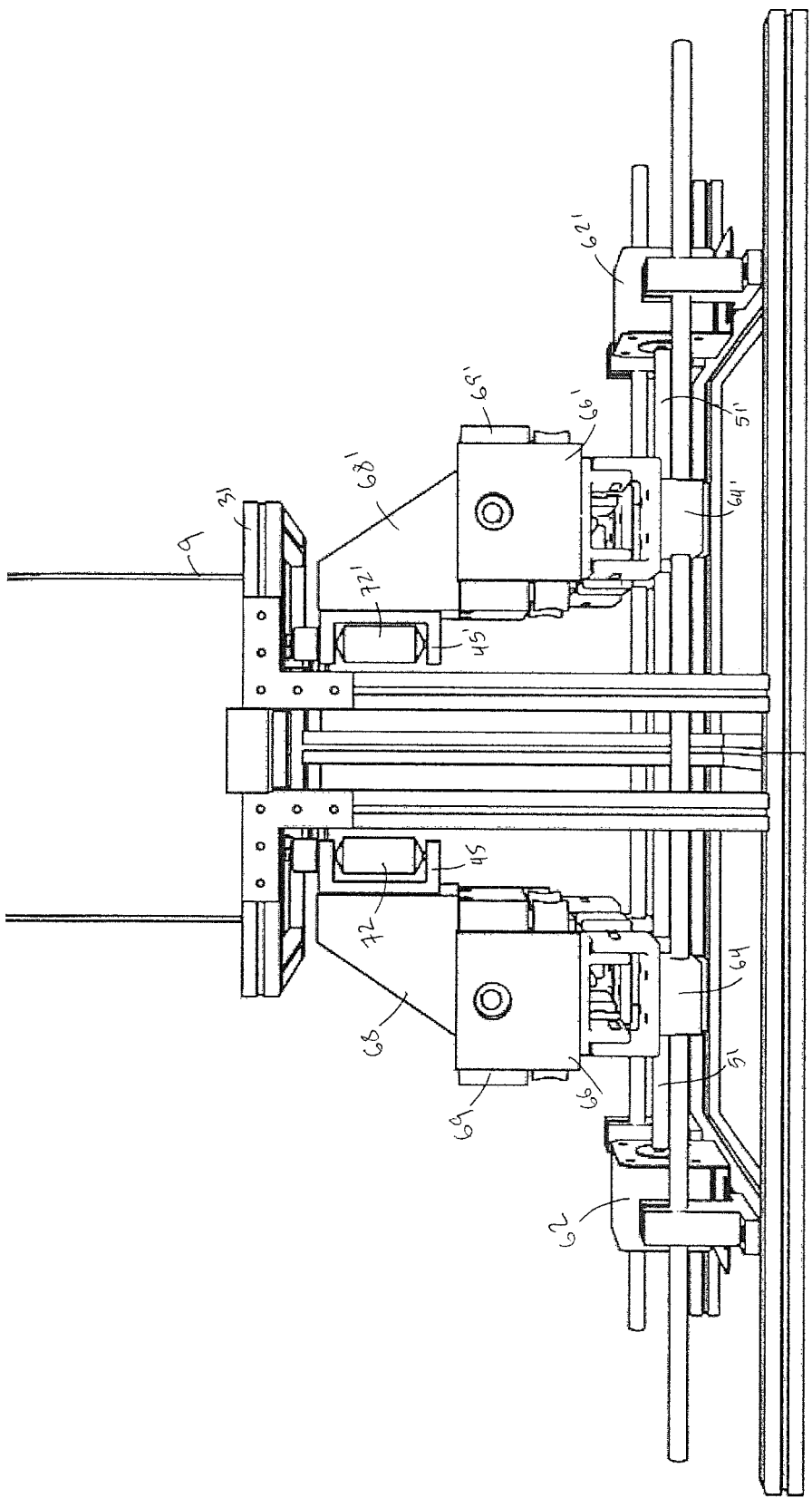
FIG. 20 is front view of the embodiment of FIG. 18 having a set of eyeglass frames mounted therein.
Figure 21:
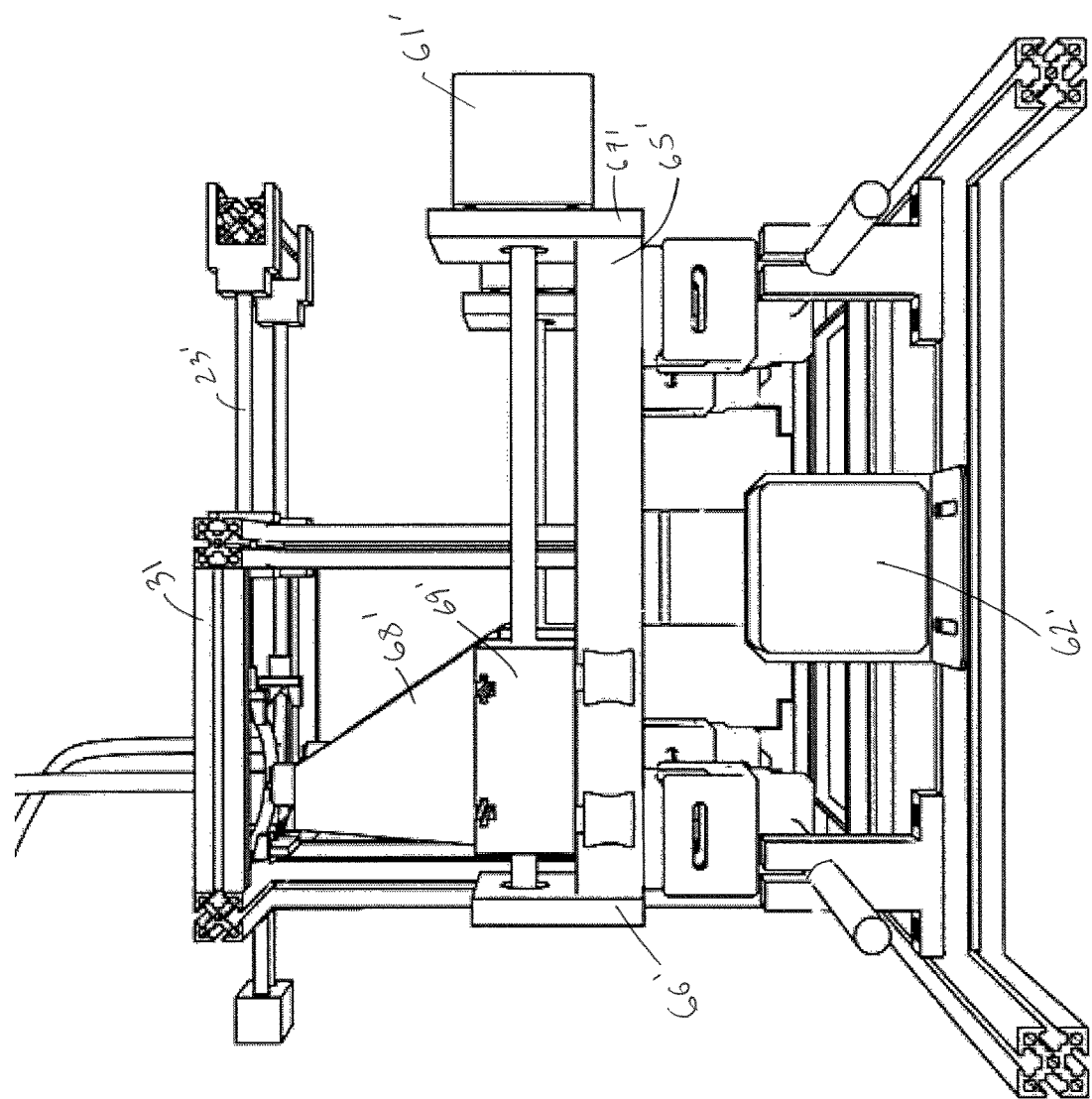
FIG. 21 is a side view of the embodiment of FIG. 18.
Figure 22:
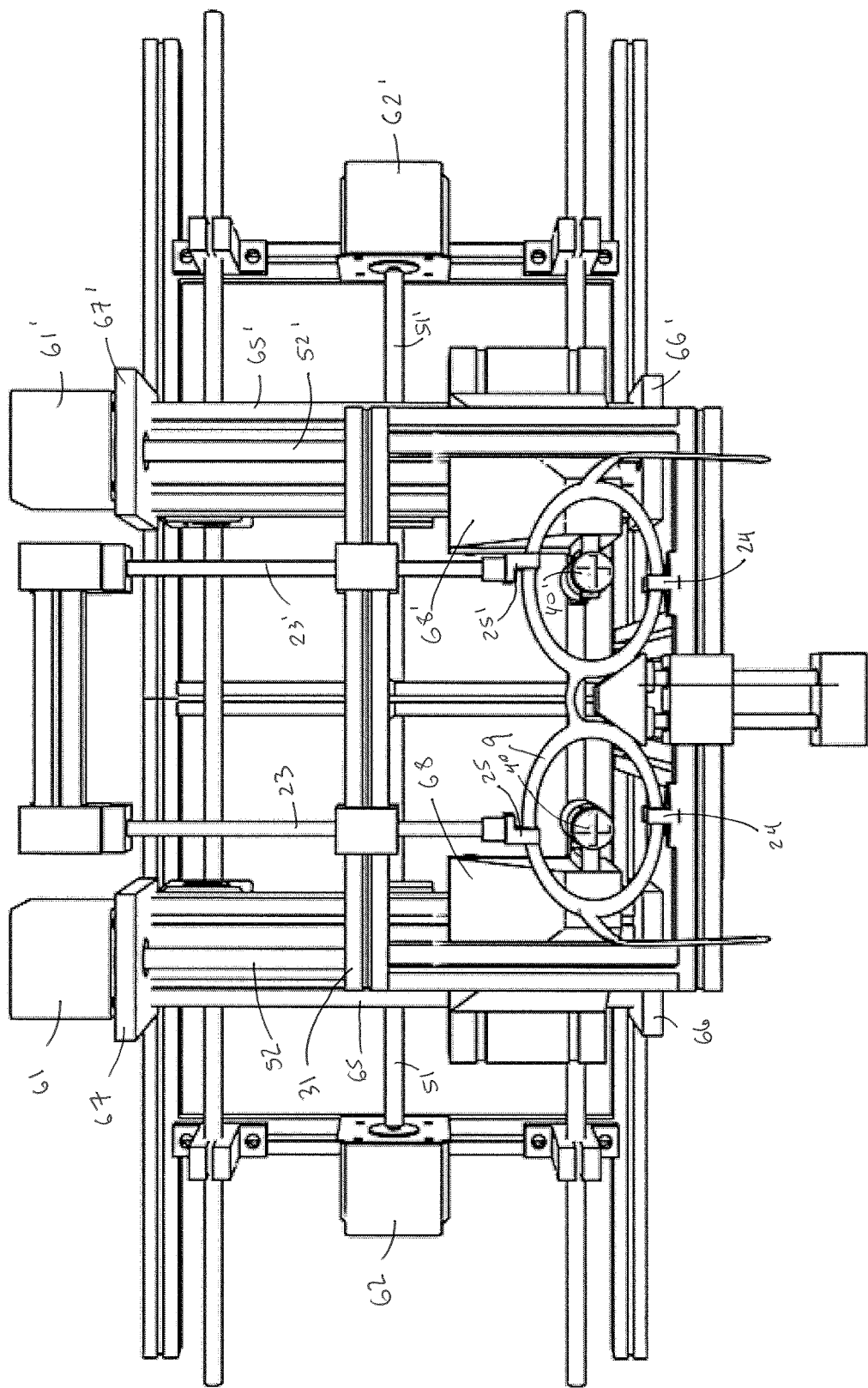
FIG. 22 is a top view of the embodiment of FIG. 18.

Another alternative embodiment of an apparatus of the invention is illustrated in FIGS. 18-22. In this illustrated embodiment, clamps 23, 23', which may be spring loaded, are provided on a support bracket 31, and include upper 25 (left) and upper 25' (right) brackets, and lower 24 (left) and lower 24' (right) brackets for engaging the upper and lower edges of the eyeglass frame 9 to hold the frame in a fixed position, as shown in FIG. 19. Two marker moving assemblies are provided below support bracket 31 for moving left and right markers 40, 41' in the X and Y directions according to the left and right monocular pupillary distances and segment heights of a patient.

In the illustrated embodiment of FIGS. 18-22, movement along the X axis is accomplished as follows: each of support blocks 64, 64' include a threaded bore which receives a threaded rod 51, 51' which is attached to a motor, micrometer or other rotation imparting device 62, 62'. Support blocks 64, 64' are attached to cross supports 65, 65' having brackets 66, 66' at one end, and brackets 67, 67' at the opposite end. Cross supports 65, 65' are each attached to an upper support 69, 69' which is attached to another upper support 68, 68'. Marker supports 45, 45' are attached to supports 68, 68'. Rotational movement may be imparted to each of threaded rods 51, 51' by devices 62, 62'. This rotational movement causes support blocks 64, 64' to move along the X axis, which also moves each of the structures attached thereto along the X axis as well (i.e., cross supports 65, 65' supports 69, 69' supports 68, 68' and supports 45, 45'). This rotational movement moves each marker support 45, 45' along the X axis, with clockwise rotation causing linear movement in one direction, and counter-clockwise rotation causing linear movement in the opposite direction. It is to be appreciated that in some embodiments, some of the intermediary supports such as 68, 68' and/or 69, 69' may be eliminated or consolidated into single supports. It is to be appreciated that by precisely rotating each motor 62, 62' that each marker support 45, 45' may be moved to a precise location on the X axis for positioning each marker 40, 40' attached thereto according to the left and right monocular pupillary distances of a patient. The rotational movement may be accomplished manually using a micrometer or the like, or using motors in communication with an electronic control system where the measurements are input. In the embodiment illustrated in FIGS. 18-22, upward or vertical movement of markers 40, 40' may be accomplished using solenoids 72 (left) and 72' (right) which may be electronically activated. This upward movement allows markers 40, 40' to place temporary marks on lenses 7, 7' mounted in frame 9.

In the illustrated embodiment of FIGS. 18-22, movement along the Y axis is accomplished as follows: each of support blocks 69, 69' include a threaded bore which receives a threaded rod 52, 52' which is attached to a motor, micrometer or other rotation imparting device 61, 61'. It is to be appreciated that motors 61, 61' as well as support blocks 69, 69' are all attached directly or indirectly to cross members 65, 65' such that when cross members 65, 65' are moved in the X direction by motors 62, 62', this movement also moves motors 61, 61' along with support blocks 69, 69' in the X direction. As noted above, support blocks 69, 69' are attached to upper supports 68, 68', and marker supports 45, 45' are attached to upper supports 68, 68'. Thus, when rotational movement is imparted to each of threaded rods 52, 52' by motors 61, 61', this rotational movement causes support blocks 69, 69' to move along the Y axis, which also moves marker supports 45, 45' along the Y axis, with clockwise rotation causing linear movement in one direction, and counter-clockwise rotation causing linear movement in the opposite direction. It is to be appreciated that in some embodiments, some of the intermediary supports such as 68, 68' and/or 69, 69' may be eliminated or consolidated into single supports. It is to be appreciated that by precisely rotating each motor 61, 61' that each marker support 45, 45' may be moved to a precise location on the Y axis for positioning each marker 40, 40' attached thereto according to the left and right segment heights of a patient. The rotational movement may be accomplished manually using a micrometer or the like, or using motors in communication with an electronic control system where the measurements are input. In the embodiment illustrated in FIGS. 18-22, upward or vertical movement of markers 40, 40' may be accomplished using solenoids 72 (left) and 72' (right) which may be electronically activated. This upward movement allows markers 40, 40' to place temporary marks on lenses 7, 7' mounted in frame 9.

Figure 23:
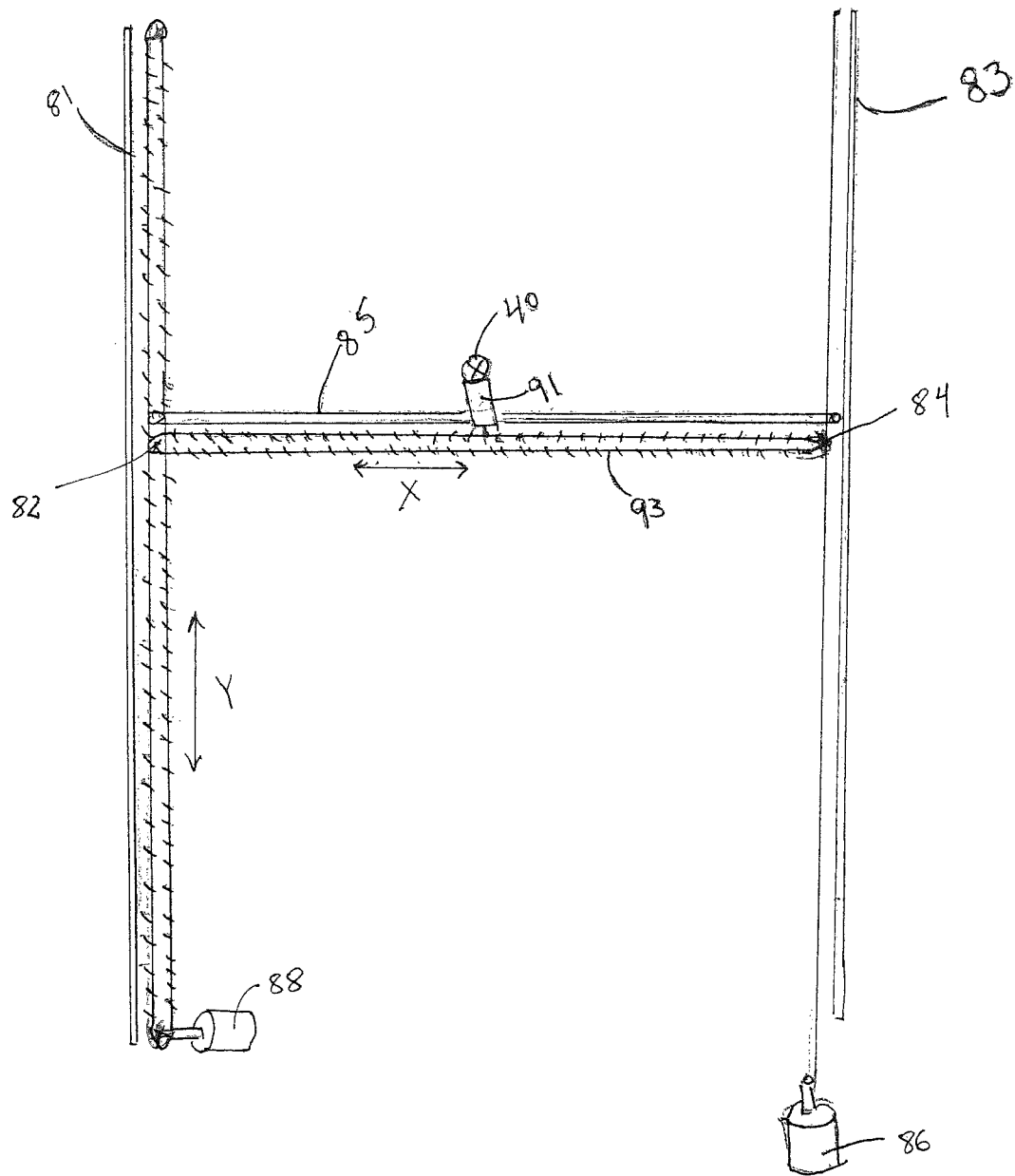
FIG. 23 is a diagrammatic view of another alternative embodiment of the invention.

In alternative embodiments, the X-Y positioning of the markers 40, 40' may be accomplished using an H-frame for each lens, as shown in FIG. 23. It is to be appreciated that in some embodiments, one H-frame system may be used for the left lens and another for the right lens; and in other embodiments a single H-frame system may be used for both lenses. An embodiment of an H-frame for a single lens includes left 81 and right 83 parallel members, and a perpendicular cross member 85. A marker 40 may be attached to a mount 91 that is slidably deployed on the cross member 85 of the H frame. Mount 91 is engaged to a continuous track, chain or belt 93 which extends from one end of cross member 85 to the other. In some embodiments, track 93 may be engaged around a first sprocket 82 located on left frame member 81, and around a second sprocket 84 located on right frame member 83. One of sprockets 82 or 84 is attached directly or indirectly to a motor or other device 86 for imparting rotational movement to the sprocket. When motor 86 is operated, track 93 is moves which causes mount 91 to move left or right on the X axis along cross member 85, depending upon which direction the motor rotates. Mount 91 may be positioned on the X axis according to a monocular pupillary distance of the patient.

In the H-frame embodiments such as FIG. 23, the opposite ends of cross member 85 are movably mounted to left 81 and right 83 parallel members of the H frame, allowing cross member 85 to move up and down along the Y axis, along with track 93 and sprockets 82, 84. One end of cross member 85 may be guided by and follow one of the parallel members (e.g. 81), while the opposite end of cross member 85 may be attached to a continuous chain, belt or track 95 located along the other parallel member (e.g. 83). Track 95 is engaged around a sprocket at one end and a motor 88 at the opposite end. Imparting motion to track 95 using the motor 88 causes cross member 85 to move up or down along the Y axis, bringing mount 91 with it. Mount 91 may be positioned on the Y axis according to a segment height of the patient. In some embodiments, coordinated tracks 95 may be provided along both parallel members 81 and 83 for moving cross member 85 along the Y axis.

It is to be appreciated that in some embodiments of the invention, a single marking mechanism may be provided which moves to a first location to mark one of the lenses, and then moves to a second location to mark the other lens. A single one of any of the marker moving mechanisms disclosed herein may be used in this way. In these embodiments, a set of eyeglass frames with demo lenses are mounted in a fixed position. A single marker is then moved to a first position below one of the lenses (e.g. left) according to the monocular pupillary distance and the segment height for that lens. If appropriate, the marker is further moved to compensate for the frame thickness. The lens is then temporarily marked. Then, the same marker is moved to a second position below the other lens (e.g. right) according to the monocular pupillary distance and the segment height for the other lens. If appropriate, the marker is further moved to compensate for the frame thickness. The other lens is then temporarily marked. Once both lenses have been marked, the frame and lenses may be taken to the patient for verification.

In some embodiments, an optical or other sensor may be provided which senses and measures the frame height. This information is then communicated to an embodiment of the invention to adjust the Y positions of the markers 40, 40' according to the measured frame height. It is to be appreciated that for some frame styles, there is no portion of the frame below the lenses such that no frame height adjustment is needed. It is to be appreciated that for some frame styles made of, for example, transparent and/or translucent materials, the use of an optical sensor may not be appropriate since it may not accurately locate or measure such a frame.

In some embodiments, sensors may be provided or associated with each marking device and/or with each motor to determine the position of such marker and provide such positioning information to a control unit for display to a user. Information from such sensors may be also be used to confirm and display the position of each marker as it is traveling and when it stops, and/or to indicate when the positioning mechanism for the marker should be recalibrated or reset.

Figure 9:
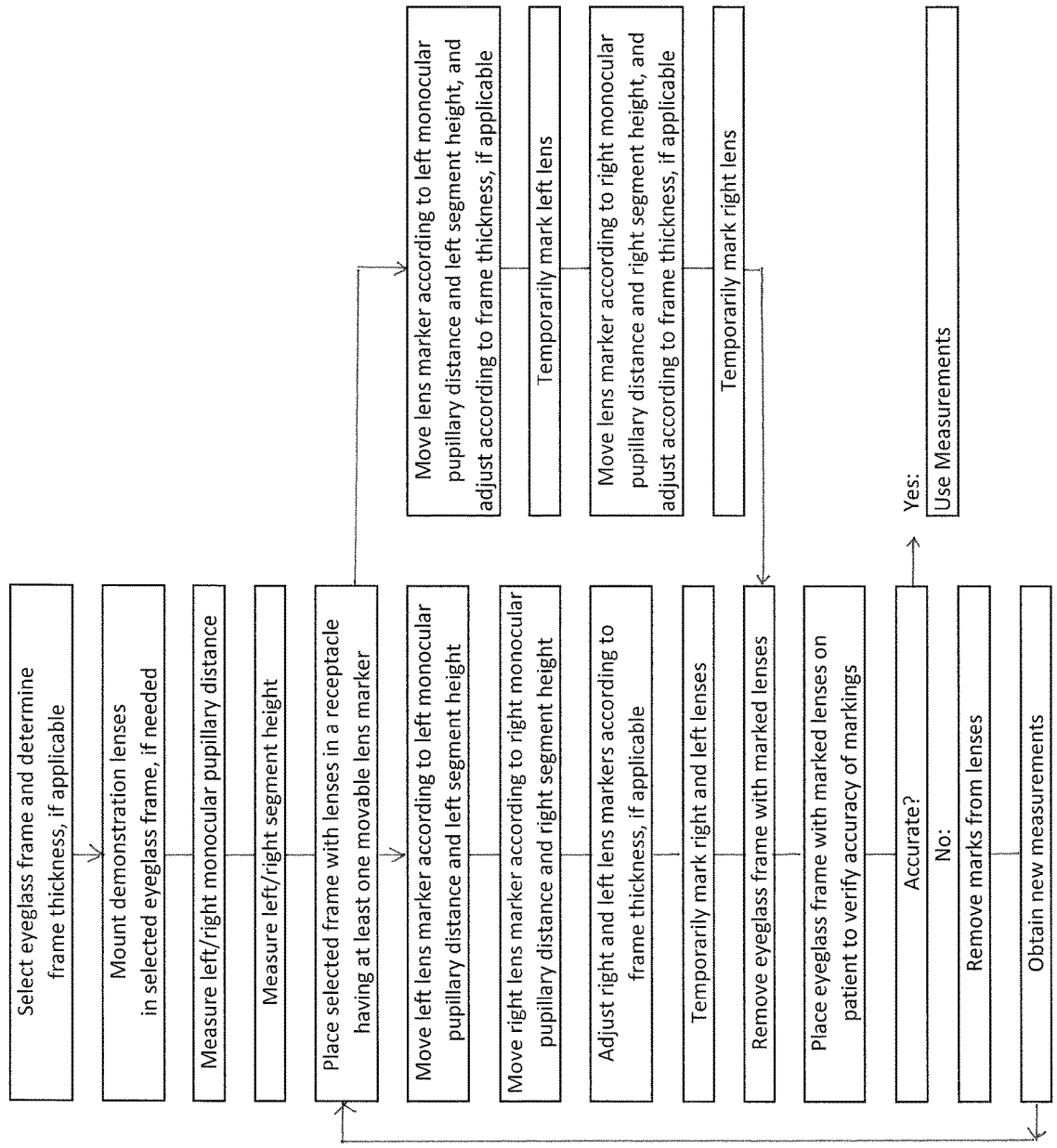
FIG. 9 is a diagram illustrating exemplary steps of embodiments of the methods of the present invention.
Figure 10:
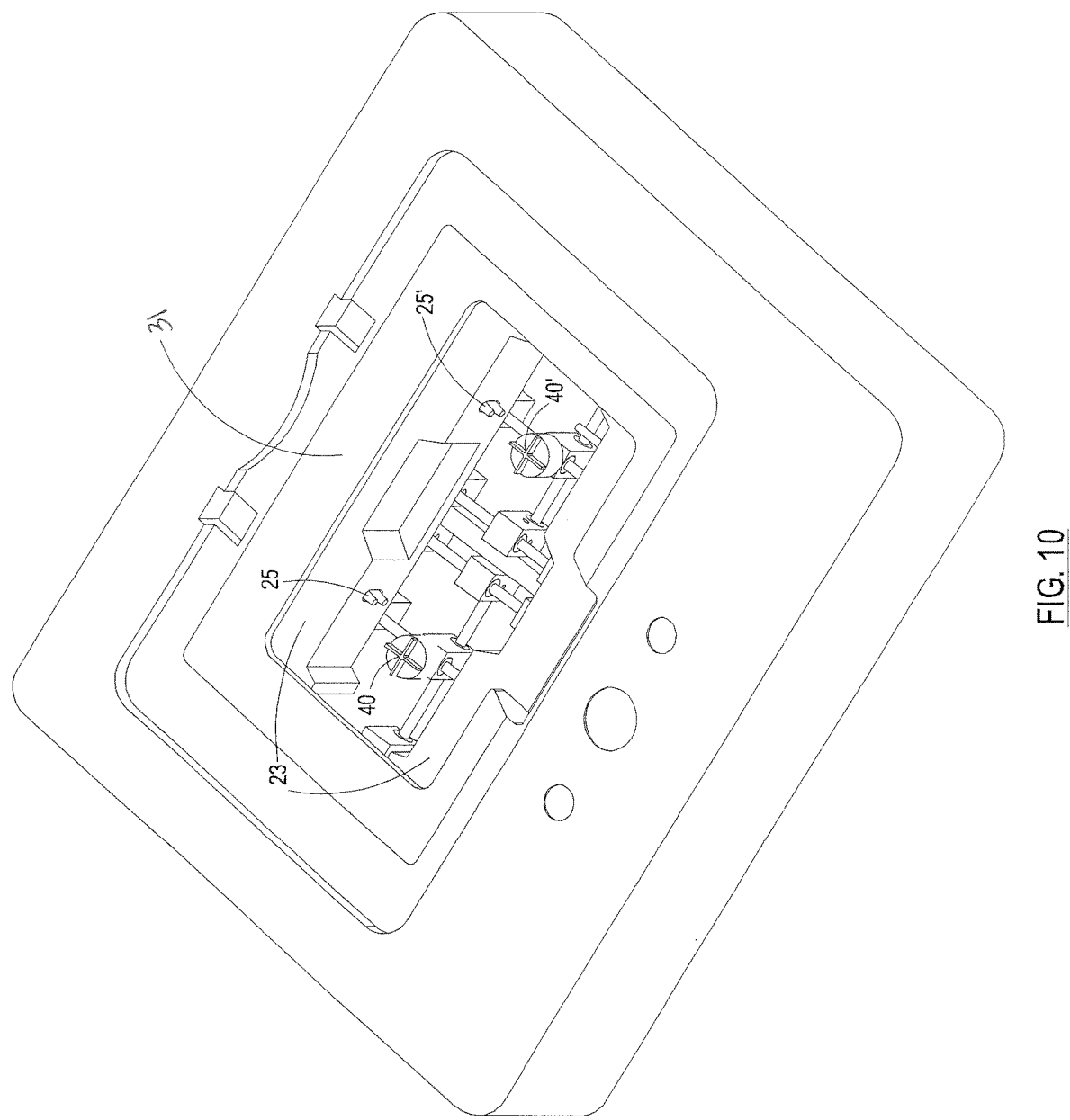
FIG. 10 is a perspective view of an alternative embodiment of the invention in an empty condition.

In one exemplary embodiment of a method of the invention, a practitioner takes four measurements from the patient's face: (1) the right monocular pupillary distance, (2) the right segment height, (3) the left monocular pupillary distance, and (4) the left segment height. The practitioner also determines (5) the thickness of the frames selected by the patient. The fifth measurement of frame thickness may not be needed if the selected style of frame does not have any material below the lenses. Then, a set of demonstration lenses are inserted into the selected frame. The frame is then placed into a receptacle above at least one movable lens marker. The four measurements together with the frame thickness, if applicable, are used to cause the one or more markers to be positioned at the two pupil locations. These locations are then temporarily marked on the demo lenses, which are then taken back to the patient to check to see if the correct pupil locations have, in fact, been measured. If correct, then the measurements are used to create the final lenses. If not correct, new measurements of right/left monocular pupillary distance and right/left segment height are obtained, the temporary marks are removed, and the frame and lenses are again placed in the receptacle, and marked according to the new measurements. This is repeated until the marks are correct, and only then are the measurements used to create the patient's lenses. See FIG. 9.

It is to be understood that variations and modifications of the present invention may be made without departing from the scope thereof. In particular, and without limitation, each of the various features and/or aspects of each embodiment disclosed herein may be used with other features and/or aspects of other embodiment disclosed herein in different combinations. For example, and without limitation, the eyeglass frame support structure illustrated in FIGS. 11-12 may be used with any of the marker moving mechanisms of the other embodiments disclosed herein. By way of another example, and without limitation, the combination of the removable frame support 21 and receptacle 31 of the embodiment of FIGS. 1-8 may be used with any of the other marker moving mechanisms of the other embodiments disclosed herein. By way of another example, and without limitation, for each of the embodiments that illustrate use of a pair of marking mechanisms, one for each lens, a single such marking mechanism may be used to mark both lenses. Other combinations of features of the various embodiments disclosed herein are also included within the scope of the invention. It is also to be understood that the present invention is not to be limited by the specific embodiments disclosed herein, but only in accordance with the appended claims when read in light of the foregoing specification.

What is claimed is:

1. An apparatus for marking eyeglass lenses with measured positions of a patient's pupils comprising:
   a. a support frame for receiving an eyeglass frame with lenses, said support frame being movably suspended above a surface of a plate base by a plurality of springs, wherein one end of each of said springs is fixed on the plate base;
   b. a left lens marking member movably mounted to a first movable marker support;
   c. a right lens marking member movably mounted to a second marker movable support;
   d. a first positioning mechanism for moving said first movable marker support in a first horizontal direction according to the patient's left monocular pupillary distance;
   e. a second positioning mechanism for moving said first movable marker support in a second horizontal direction that is orthogonal to said first direction according to the patient's left segment height;

f. a third positioning mechanism for moving said second movable marker support in a third horizontal direction that is parallel to said first direction according to the patient's right monocular pupillary distance; and g. a fourth positioning mechanism for moving said second movable marker support in a fourth horizontal direction that is orthogonal to said third direction according to the patient's right segment height.

2. The apparatus of claim 1 further comprising measuring indicia associated with said first, second, third and fourth positioning mechanisms for use in precisely positioning said movable marker supports.

3. The apparatus of claim 1 wherein at least one of said first, second, third, and fourth positioning mechanisms is manually operated.

4. The apparatus of claim 1 wherein at least one of said first, second, third, and fourth positioning mechanisms is operated using a micrometer.

5. The apparatus of claim 1 wherein at least one of said first, second, third, and fourth positioning mechanisms is motorized.

6. The apparatus of claim 5 further comprising an electronic control in communication with said at least one motorized positioning mechanism and in communication a user interface for receiving measurements of a patient's left and right monocular pupillary distances and for receiving measurements of the patient's left and right segment heights, wherein said electronic control is capable of causing said first, second, third and fourth positioning mechanisms to move said first and second movable supports according to said measurements.

7. The apparatus of claim 6 further comprising a fifth positioning mechanism for moving said movable marker supports relative to said support frame in a fifth horizontal direction that is orthogonal to said first and third directions, wherein all of said positioning mechanisms are motorized, and wherein said electronic control is capable of causing said fifth positioning mechanism to move said movable marker supports in a fifth horizontal direction relative to said support frame according to a height of said eyeglass frame.

8. The apparatus of claim 6 wherein each of said positioning mechanisms includes a threaded rod rotatably deployed through a threaded bore in a support block such that rotation of said rod imparts linear motion to said support block.

9. The apparatus of claim 6 further comprising a first solenoid attached to said left lens marking member and to said first movable marker support for moving said left marking member in a vertical direction, and a second solenoid attached to said right lens marking member and to said second movable marker support for moving said right marking member in a vertical direction.

10. The apparatus of claim 6 further comprising at least one display of the patient's measured left and right monocular pupillary distances and the patient's measured left and right segment heights.

11. The apparatus of claim 6 further comprising at least one display of the positions of said left and right lens marking members.

12. The apparatus of claim 6 further comprising a fifth positioning mechanism for moving said movable marker supports relative to said support frame in a fifth horizontal direction, wherein all of said positioning mechanisms are motorized, and wherein said electronic control is capable of causing said fifth positioning mechanism to move said support frame in a fifth horizontal direction that is orthogonal to said first and third directions relative to said movable marker supports according to a height of said eyeglass frame.

13. The apparatus of claim 1 wherein at least one of said first, second, third, and fourth positioning mechanisms is a step motor.

14. The apparatus of claim 1 wherein said base further comprises a receptacle such that said support frame may be removably inserted into said receptacle.

15. The apparatus of claim 14 further comprising at least one deformable cushion provided in said receptacle that allows said support frame to move within said receptacle.

16. The apparatus of claim 1 further comprising at least one clamp for holding said eyeglass frame in said support frame.

17. The apparatus of claim 1 further comprising at least one movable wall for holding said eyeglass frame in said support frame.

18. A method of verifying optical measurements taken from a patient's face comprising the steps of:

a. taking four measurements from the patient's face: (1) the right monocular pupillary distance, (2) the right segment height, (3) the left monocular pupillary distance, and (4) the left segment height;

b. placing a selected eyeglass frame having demonstration lenses mounted therein into a receptacle that is suspended above a surface of a mounted plate base by a plurality of springs, wherein one end of each of said springs is fixed on the plate base, said plate base being mounted adjacent to right and left movable lens marking devices, each such movable lens marking device having a pair of horizontal positioning mechanisms for manipulating the horizontal position of each of said right and left marking devices;

c. moving said right movable lens marking device according to the patient's right facial measurements using first and second horizontal positioning mechanisms;

d. moving said left movable lens marking device according to the patient's left facial measurements using third and fourth horizontal positioning mechanisms;

e. temporarily marking each of said lenses after said movements (c-d) have been accomplished;

f. removing the eyeglass frame with marked lenses from the receptacle; and g. placing the eyeglass frame with marked lenses on the patient to check the measurements taken from the patient using the positions marked on the lenses.

19. The method of claim 18 comprising the additional steps of:

h. updating the patient's facial measurements;

i. removing any temporary marks from said lenses; and j. repeating steps b-g using the updated facial measurements.

20. The method of claim 18 comprising the additional steps of:

h. determining the thickness of the selected eyeglass frame;

i. adjusting the positions of each of said movable lens marking devices according to the eyeglass frame thickness before marking each lens.

21. The method of claim 18 wherein the step of temporarily marking each of said lenses is accomplished using a solenoid to move the marking device against the lens.

22. The method of claim 18 wherein the step of temporarily marking each of said lenses is accomplished by pushing said eyeglass frame in a downward vertical direction to bring the lenses against their respective marking devices.

\* \* \* \* \*